(12) United States Patent
Yoshimura

(10) Patent No.: US 10,898,971 B2
(45) Date of Patent: Jan. 26, 2021

(54) THREE-DIMENSIONAL DEPOSITION DEVICE AND THREE-DIMENSIONAL DEPOSITION METHOD

(71) Applicant: MITSUBISHI HEAVY INDUSTRIES, LTD., Tokyo (JP)

(72) Inventor: Hitoshi Yoshimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 605 days.

(21) Appl. No.: 15/129,923

(22) PCT Filed: Mar. 20, 2015

(86) PCT No.: PCT/JP2015/058496
§ 371 (c)(1),
(2) Date: Sep. 28, 2016

(87) PCT Pub. No.: WO2015/151864
PCT Pub. Date: Oct. 8, 2015

(65) Prior Publication Data
US 2017/0136578 A1 May 18, 2017

(30) Foreign Application Priority Data

Mar. 31, 2014 (JP) ................................. 2014-074058

(51) Int. Cl.
B23K 26/03 (2006.01)
B23K 26/342 (2014.01)
(Continued)

(52) U.S. Cl.
CPC .......... B23K 26/342 (2015.10); B22F 3/1055 (2013.01); B22F 3/16 (2013.01);
(Continued)

(58) Field of Classification Search
CPC .............. B23K 26/342; B23K 26/0648; B23K 26/0643; B23K 26/127; B23K 26/034;
(Continued)

(56) References Cited

U.S. PATENT DOCUMENTS 5,393,482 A * 2/1995 Benda ................... B22F 3/1055
419/1
5,477,026 A 12/1995 Buongiorno
(Continued)

FOREIGN PATENT DOCUMENTS

CN 1550874 A 12/2004
CN 1648802 A 8/2005
(Continued)

OTHER PUBLICATIONS

JP2009241138A (Year: 2008).*
(Continued)

Primary Examiner — Tu B Hoang
Assistant Examiner — Tiffany T Tran
(74) Attorney, Agent, or Firm — Birch, Stewart, Kolasch & Birch, LLP

(57) ABSTRACT

A three-dimensional deposition device and a three-dimensional deposition method used to highly accurately manufacture a three-dimensional object are provided. A three-dimensional deposition device for forming a three-dimensional shape by depositing a formed layer on a base unit includes: a powder supply unit which supplies a powder material; a light irradiation unit which irradiates the powder material with a light beam so that at least a part of the powder material irradiated with the light beam is sintered or melted and solidified to form the formed layer; a heating unit which selectively heats an area having passed through a position irradiated with the light beam in the base unit or the formed layer or an area not having passed through the
(Continued)

position irradiated with the light beam; and a control device which controls operations of the powder supply unit, the light irradiation unit, and the heating unit.

20 Claims, 25 Drawing Sheets

(51) Int. Cl.
| | |
|---|---|
| *B33Y 30/00* | (2015.01) |
| *B23K 26/144* | (2014.01) |
| *B23K 26/06* | (2014.01) |
| *B33Y 10/00* | (2015.01) |
| *B22F 3/105* | (2006.01) |
| *B23K 26/00* | (2014.01) |
| *B23K 26/14* | (2014.01) |
| *B23K 26/082* | (2014.01) |
| *B23K 26/12* | (2014.01) |
| *B23K 26/04* | (2014.01) |
| *B22F 3/16* | (2006.01) |
| *B33Y 50/02* | (2015.01) |
| *B23K 103/02* | (2006.01) |
| *B23K 103/10* | (2006.01) |
| *B23K 103/12* | (2006.01) |
| *B23K 103/14* | (2006.01) |

(52) U.S. Cl.
CPC ........ *B23K 26/0093* (2013.01); *B23K 26/034* (2013.01); *B23K 26/0342* (2015.10); *B23K 26/04* (2013.01); *B23K 26/0608* (2013.01); *B23K 26/0643* (2013.01); *B23K 26/0648* (2013.01); *B23K 26/082* (2015.10); *B23K 26/127* (2013.01); *B23K 26/144* (2015.10); *B23K 26/1476* (2013.01); *B33Y 10/00* (2014.12); *B33Y 30/00* (2014.12); *B33Y 50/02* (2014.12); *B22F 2003/1056* (2013.01); *B22F 2003/1057* (2013.01); *B22F 2301/052* (2013.01); *B22F 2301/10* (2013.01); *B22F 2301/205* (2013.01); *B22F 2301/35* (2013.01); *B22F 2998/10* (2013.01); *B23K 2103/02* (2018.08); *B23K 2103/10* (2018.08); *B23K 2103/12* (2018.08); *B23K 2103/14* (2018.08); *Y02P 10/25* (2015.11)

(58) Field of Classification Search
CPC ............................ B23K 26/04; B23K 26/0342; B23K 26/0093; B23K 26/0608; B23K 26/1476; B23K 26/082; B23K 26/144; B23K 2103/02; B23K 2103/14; B23K 2103/12; B23K 2103/10; B23K 26/046; B23K 26/073; B23K 26/14; B23K 26/38; B23K 26/06; B33Y 50/02; B33Y 10/00; B33Y 30/00; B22F 3/16; B22F 3/1055; B22F 2301/10; B22F 2301/052; B22F 2003/1057; B22F 2998/10; B22F 2301/35; B22F 2301/205; B22F 2003/1056; Y02P 10/295; G02B 15/14; G02B 27/09; G02B 7/08; H01L 31/042; H01L 31/0508; H01L 31/0512; Y02E 10/542; Y02E 10/549
USPC .... 219/121.63–121.66, 121.6; 359/432, 513, 359/112.75; 438/73
See application file for complete search history.

(56) References Cited

U.S. PATENT DOCUMENTS

| | | | | |
|---|---|---|---|---|
| 6,046,426 | A * | 4/2000 | Jeantette | B01F 13/0255 |
| | | | | 219/121.63 |
| 6,401,001 | B1 * | 6/2002 | Jang | H01L 21/288 |
| | | | | 204/192.15 |
| 2002/0051853 | A1 | 5/2002 | Keicher et al. | |
| 2003/0206820 | A1 | 11/2003 | Keicher et al. | |
| 2004/0118818 | A1 * | 6/2004 | Oda | B23K 26/0608 |
| | | | | 219/121.64 |
| 2004/0223229 | A1 | 11/2004 | Ishikawa | |
| 2004/0241922 | A1 * | 12/2004 | Toida | B23K 26/0613 |
| | | | | 438/166 |
| 2007/0193981 | A1 * | 8/2007 | Peng | B23K 26/1476 |
| | | | | 219/121.33 |
| 2007/0298182 | A1 * | 12/2007 | Perret | B22F 3/1055 |
| | | | | 427/427.3 |
| 2009/0152771 | A1 | 6/2009 | Philippi et al. | |
| 2009/0154504 | A1 * | 6/2009 | Sato | B41J 2/471 |
| | | | | 372/10 |
| 2009/0283501 | A1 | 11/2009 | Erikson et al. | |
| 2011/0042360 | A1 * | 2/2011 | Takahashi | B23K 26/046 |
| | | | | 219/121.62 |
| 2011/0248001 | A1 * | 10/2011 | Kawanaka | C30B 11/00 |
| | | | | 219/76.1 |
| 2012/0211351 | A1 * | 8/2012 | Tomyo | B82Y 10/00 |
| | | | | 204/192.1 |
| 2013/0044371 | A1 * | 2/2013 | Rupp | B23K 26/073 |
| | | | | 359/432 |
| 2013/0146568 | A1 * | 6/2013 | Moffitt | H01L 21/428 |
| | | | | 219/121.61 |
| 2016/0207144 | A1 * | 7/2016 | Narita | B23K 26/0617 |

FOREIGN PATENT DOCUMENTS

| | | |
|---|---|---|
| CN | 1827281 A | 9/2006 |
| CN | 101678613 A | 3/2010 |
| EP | 2213401 A1 | 8/2010 |
| JP | 3-32481 A | 2/1991 |
| JP | 10-501463 A | 2/1998 |
| JP | 11-333584 A | 12/1999 |
| JP | 2003-19589 A | 1/2003 |
| JP | 2004-82556 A | 3/2004 |
| JP | 2004-253783 A | 9/2004 |
| JP | 2007-222869 A | 9/2007 |
| JP | 2007-286481 A | 11/2007 |
| JP | 2007-301980 A | 11/2007 |
| JP | 2008-183614 A | 8/2008 |
| JP | 2009-1900 A | 1/2009 |
| JP | 2009-274136 A | 11/2009 |
| JP | 2010-207874 A | 9/2010 |

OTHER PUBLICATIONS

English Translation of JP2009241138A (Year: 2008).*
International Search Report, issued in PCT/JP2015/058496, dated Jun. 16, 2015.
Written Opinion of the International Searching Authority, issued in PCT/JP2015/058496, dated Jun. 16, 2015.
Taiwanese Office Action and Search Report, dated Mar. 28, 2017, issued in Taiwanese Application No. 104110108, together with an English translation.
Office Action dated Aug. 2, 2017 issued in the corresponding Chinese Patent Application No. 201580017061.1 with an English Translation.
English translation of the Written Opinion of the International Searching Authority, dated Jun. 16, 2015, for International Application No. PCT/JP2015/058496.
Extended European Search Report, dated Mar. 22, 2017, for European Application No. 15773604.2.

* cited by examiner

THREE-DIMENSIONAL DEPOSITION DEVICE AND THREE-DIMENSIONAL DEPOSITION METHOD

FIELD

The present invention relates to a three-dimensional deposition device and a three-dimensional deposition method used to manufacture a three-dimensional object by deposition.

BACKGROUND

As a technology of manufacturing a three-dimensional object, there is known a deposition shaping technology of manufacturing a three-dimensional object by irradiating a metallic powder material with a light beam. For example, Patent Literature 1 discloses a method in which a powder layer formed of a metallic powder material is irradiated with a light beam so that a sintered layer is formed and this process is repeated so that a plurality of sintered layers are integrally deposited to thereby form a three-dimensional object. Further, Patent Literature 2 discloses a device which includes a separable conical nozzle having a center opening used to output a laser beam and powdered metal. Here, a work is irradiated with a laser as a processing target to form a thin liquefied metal reserved part and powdered metal is supplied to that position to form padding.

CITATION LIST

Patent Literature

Patent Literature 1: Japanese Laid-open Patent Publication No. 2009-1900
Patent Literature 2: Japanese Laid-open Patent Publication No. 10-501463

SUMMARY

Technical Problem

Incidentally, there has been a demand to manufacture the three-dimensional object with high accuracy in the deposition shaping technology of manufacturing the three-dimensional object.

An object of the invention is to provide a three-dimensional deposition device and a three-dimensional deposition method used to manufacture a three-dimensional object with high accuracy.

Solution to Problem

To solve the problem and achieve the object above, a three-dimensional deposition device of this invention forms a three-dimensional shape by depositing a formed layer on a base unit, includes: a powder supply unit which supplies a powder material; a light irradiation unit which irradiates the powder material with a light beam so that at least a part of the powder material irradiated with the light beam is sintered or melted and solidified to form the formed layer; a heating unit which selectively heats an area having passed through a position irradiated with the light beam in the base unit or the formed layer or an area not having passed through the position irradiated with the light beam; and a control device which controls operations of the powder supply unit, the light irradiation unit, and the heating unit.

It is preferable that in the three-dimensional deposition device, the powder supply unit injects the powder material toward the base unit, and the light irradiation unit irradiates the powder material feeding from the powder supply unit toward the base unit with a light beam so that the powder material is melted and the melted powder material is solidified on the base unit to thereby form the formed layer.

It is preferable that in the three-dimensional deposition device, the powder supply unit is concentrically disposed on an outer periphery of the light irradiation unit and is formed so that a powder passage causing the powder material to flow therethrough is formed between an inner tube surrounding a path through which the light beam of the light irradiation unit pass and an outer tube covering the inner tube.

It is preferable that the three-dimensional deposition device includes a movement mechanism that relatively moves the light irradiation unit and the powder supply unit with respect to the base unit, wherein the control device determines a path through which the light irradiation unit and the powder supply unit pass with respect to the base unit by the movement mechanism.

It is preferable in the three-dimensional deposition device that the heating unit includes a light source unit which outputs a light beam, and a heating operation is performed by irradiation with the light beam output from the light source unit.

It is preferable that in the three-dimensional deposition device, the light beam is a laser beam.

It is preferable that in the three-dimensional deposition device, the heating unit includes an irradiation position adjustment mechanism including a mirror which reflects the light beam output from the light source unit and an angle adjustment mechanism which adjusts an angle of the mirror.

It is preferable that in the three-dimensional deposition device, the light source unit includes a semiconductor laser which outputs a laser beam, a light concentrating unit which concentrates the laser beam output from the semiconductor laser, and an optical fiber to which the laser beam concentrated by the light concentrating unit is incident.

It is preferable that in the three-dimensional deposition device, the light source unit includes a plurality of the semiconductor lasers and a plurality of the light concentrating units, and the laser beams which are output from the semiconductor lasers and are concentrated by the light concentrating units are incident to one optical fiber.

It is preferable that in the three-dimensional deposition device, the semiconductor laser is a vertical emission type semiconductor laser.

It is preferable that in the three-dimensional deposition device, the plurality of semiconductor lasers are provided, and the light concentrating unit includes a collimating lens which is disposed at each of the plurality of semiconductor lasers and a multiplexing unit which multiplexes the laser beams collimated by the plurality of collimating lenses and causes the laser beam to be incident to the optical fiber.

It is preferable that the three-dimensional deposition device includes a temperature detection unit which detects a temperature and a temperature distribution of a surface of the formed layer, wherein the control device controls a heating operation of the heating unit in response to a measurement result of the temperature of the surface of the formed layer obtained by the temperature detection unit.

It is preferable that in the three-dimensional deposition device, the control device controls the heating operation of the heating unit based on the measurement result of the temperature of the surface of the formed layer obtained by the temperature detection unit and characteristics of the base unit and the formed layer.

It is preferable that the three-dimensional deposition device includes a plasma emission detection unit which detects a plasma emission state of the surface of the formed layer, wherein the control device controls the heating operation of the heating unit in response to a measurement result obtained by the plasma emission detection unit.

It is preferable that the three-dimensional deposition device includes a reflected light detection unit which detects reflected light from the surface of the formed layer, wherein the control device controls the heating operation of the heating unit in response to a measurement result obtained by the reflected light detection unit.

It is preferable that in the three-dimensional deposition device, the heating unit heats the area having passed through the position irradiated with the light beam.

It is preferable that in the three-dimensional deposition device, the heating unit heats the area not having passed through the position irradiated with the light beam.

It is preferable that the three-dimensional deposition device includes a switching mechanism which switches relative positions of the light irradiation unit and the heating unit, wherein the control device controls the relative positions of the light irradiation unit and the heating unit by the switching mechanism in response to relative movement directions of the light irradiation unit, the heating unit, and the base unit and a information whether an area to be heated by the heating unit is the area having passed through the position irradiated with the light beam in the base unit or the formed layer or the area not having passed through the position irradiated with the light beam.

To solve the problem and achieve the object above, a three-dimensional deposition method of this invention forms a three-dimensional object by depositing a formed layer on a base unit, includes: a deposition step of melting a powder material by irradiating the powder material with a light beam while injecting the powder material toward the base unit, solidifying the melted powder material on the base unit to form a formed layer on the base unit, and depositing the formed layer; and a heating step of selectively heating by irradiating, with a light beam, an area having passed through a position irradiated with the light beam in the base unit or the formed layer or an area not having passed through the position irradiated with the light beam.

Advantageous Effects of Invention

According to the invention, since an mechanism for depositing a three-dimensional object and a heating unit are provided, it is possible to provide a novel device and a novel method capable of selectively heating an area having passed through a position irradiated with a light beam or an area not having passed through the position irradiated with the light beam. Accordingly, it is possible to manufacture the three-dimensional object with high accuracy.

DESCRIPTION OF EMBODIMENTS

Hereinafter, preferred embodiments of the invention will be described in detail with reference to the accompanying drawings. Further, the invention is not limited to the embodiment. Then, when there are a plurality of embodiments, a combination of the embodiments may be employed.

Figure 1:
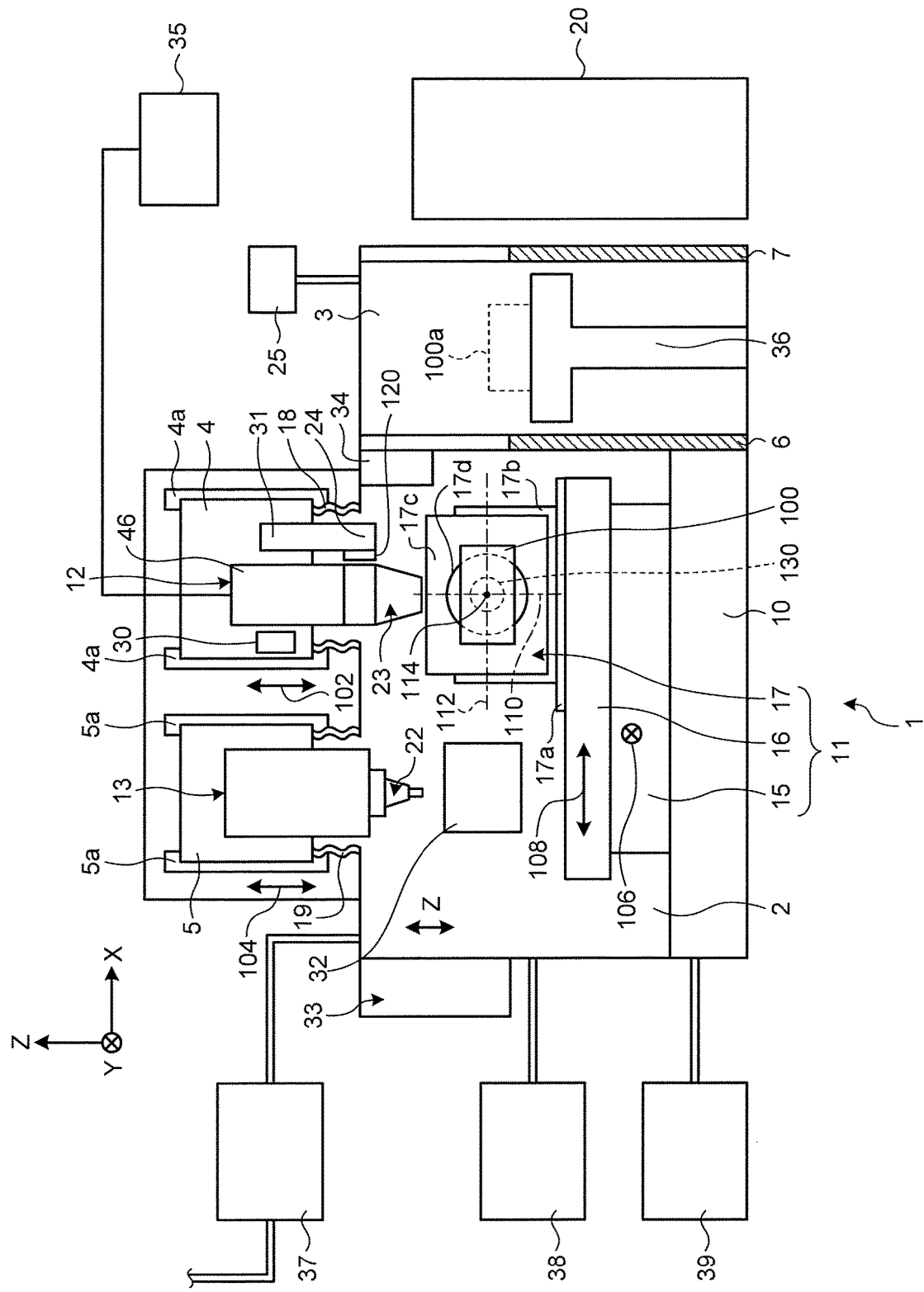
FIG. 1 is a schematic diagram illustrating a three-dimensional deposition device according to an embodiment.

FIG. 1 is a schematic diagram illustrating a three-dimensional deposition device 1 of the embodiment. Here, in the embodiment, one direction within a horizontal plane will be set as an X-axis direction, a direction orthogonal to the X-axis direction within the horizontal plane will be set as a Y-axis direction, and a direction (a vertical direction) orthogonal to each of the X-axis direction and the Y-axis direction will be set as a Z-axis direction.

The three-dimensional deposition device 1 illustrated in FIG. 1 is a device that manufactures a three-dimensional object on a base unit 100. The base unit 100 is a base member on which the three-dimensional object is formed. The base unit 100 is carried to a predetermined position of the three-dimensional deposition device 1 so that the three-dimensional object is formed on a surface thereof. The base unit 100 of the embodiment is a plate-shaped member. Further, the base unit 100 is not limited thereto. As the base unit 100, a base member of the three-dimensional object may be used or a member adding the three-dimensional object may be used. A member corresponding to a component or a product, by forming the three-dimensional object at a predetermined position, may be used as the base unit 100.

The three-dimensional deposition device 1 includes a three-dimensional deposition chamber 2, a spare chamber 3, a deposition head accommodation chamber 4, a machining unit accommodation chamber 5, a bed 10, a table unit 11, a deposition head 12, a machining unit 13, a control device 20, a heating head 31, a machining measurement unit 32, a tool exchange unit 33, a nozzle exchange unit 34, a powder introduction unit 35, an air discharge unit 37, a gas introduction unit 38, a powder collection unit 39, a temperature detection unit 120, and a weight detection unit 130.

The three-dimensional deposition chamber 2 is a casing (a chamber) in which a part other than a designed communication part such as a connection pipe is sealed from the outside. The designed communication part is provided with a valve that switches a sealed state and an opened state. If necessary, the three-dimensional deposition chamber 2 can be sealed. The three-dimensional deposition chamber 2 includes therein the bed 10, the table unit 11, the deposition head 12, a part of the machining unit 13, a part of the heating head 31, the machining measurement unit 32, the tool exchange unit 33, and the nozzle exchange unit 34.

The spare chamber 3 is provided adjacent to the three-dimensional deposition chamber 2. In the spare chamber 3, a part other than a designed communication part such as a connection pipe is sealed from the outside. The spare chamber 3 is formed as a decompression chamber that connects the outside and the three-dimensional deposition chamber 2 to each other. A base movement unit 36 is provided inside the spare chamber 3. Here, for example, an airtight door 6 is provided at the connection part with the three-dimensional deposition chamber 2 in the spare chamber 3. Further, the spare chamber 3 is connected to the outside by the airtight door 7. Further, the spare chamber 3 is provided with an air discharge unit 25 which discharges air from the spare chamber 3. When the door 7 is opened, a necessary member can be carried into the spare chamber 3 from the outside. Further, when the door 6 is opened, a member can be carried between the spare chamber 3 and the three-dimensional deposition chamber 2.

The deposition head accommodation chamber 4 is provided at an upper face of the three-dimensional deposition chamber 2 in the Z-axis direction. The deposition head accommodation chamber 4 is supported by a Z-axis slide unit 4a to be movable in the Z-axis direction (an arrow 102) with respect to the three-dimensional deposition chamber 2. A lower face of the deposition head accommodation chamber 4 in the Z-axis direction is connected to the three-dimensional deposition chamber 2 by a bellows 18. The bellows 18 connects the lower face of the deposition head accommodation chamber 4 in the Z-axis direction to the three-dimensional deposition chamber 2 so that the lower face of the deposition head accommodation chamber 4 in the Z-axis direction is formed as a part of the three-dimensional deposition chamber 2. Further, the three-dimensional deposition chamber 2 is formed so that an opening is formed in an area surrounded by the bellows 18. A space surrounded by the bellows 18 and the lower face of the deposition head accommodation chamber 4 in the Z-axis direction is connected to the three-dimensional deposition chamber 2 and is sealed along with the three-dimensional deposition chamber 2. The deposition head accommodation chamber 4 supports the deposition head 12, a shape measurement unit 30, and the heating head 31. Further, the deposition head accommodation chamber 4 is formed so that a part including a nozzle 23 of the deposition head 12 and a part including a front end 24 of the heating head 31 protrude toward the three-dimensional deposition chamber 2 from the lower face in the Z-axis direction.

When the deposition head accommodation chamber 4 moves in the Z-axis direction by the Z-axis slide unit 4a, the deposition head 12, the shape measurement unit 30, and the heating head 31 held therein are moved in the Z-axis direction. Further, the deposition head accommodation chamber 4 is connected to the three-dimensional deposition chamber 2 through the bellows 18. The bellows 18 is deformed in accordance with the movement in the Z-axis direction and thus a sealed state between the three-dimensional deposition chamber 2 and the deposition head accommodation chamber 4 can be kept.

The machining unit accommodation chamber 5 is provided at the upper face of the three-dimensional deposition chamber 2 in the Z-axis direction. Further, the machining unit accommodation chamber 5 is disposed adjacent to the deposition head accommodation chamber 4. The machining unit accommodation chamber 5 is supported by a Z-axis slide unit 5a to be movable in the Z-axis direction (a direction of an arrow 104) with respect to the three-dimensional deposition chamber 2. A lower face of the machining unit accommodation chamber 5 in the Z-axis direction is connected to the three-dimensional deposition chamber 2 by a bellows 19. The bellows 19 connects the lower face of the machining unit accommodation chamber 5 in the Z-axis direction to the three-dimensional deposition chamber 2 so that the lower face of the machining unit accommodation chamber 5 in the Z-axis direction is formed as a part of the three-dimensional deposition chamber 2. Further, the three-dimensional deposition chamber 2 is formed so that an opening is formed in an area surrounded by the bellows 19. A space surrounded by the lower face of the machining unit accommodation chamber 5 in the Z-axis direction and the bellows 19 is connected to the three-dimensional deposition chamber 2 and is sealed along with the three-dimensional deposition chamber 2. The machining unit accommodation chamber 5 supports the machining unit 13. Further, the machining unit accommodation chamber 5 is formed so that a part including a tool 22 of the machining unit 13 protrudes toward the three-dimensional deposition chamber 2 from the lower face in the Z-axis direction.

When the machining unit accommodation chamber 5 moves in the Z-axis direction by the Z-axis slide unit 5a, the machining unit 13 held therein is moved in the Z-axis direction. Further, the machining unit accommodation chamber 5 is connected to the three-dimensional deposition chamber 2 through the bellows 19. The bellows 19 is deformed in accordance with the movement in the Z-axis direction and thus a sealed state between the three-dimensional deposition chamber 2 and the machining unit accommodation chamber 5 can be kept.

The bed 10 is provided at a bottom in the three-dimensional deposition chamber 2 in the Z-axis direction. The bed 10 supports the table unit 11. Various wirings, pipes, or driving assemblies are disposed on the bed 10.

The table unit 11 is disposed on an upper face of the bed 10 and supports the base unit 100. The table unit 11 includes a Y-axis slide unit 15, an X-axis slide unit 16, and a rotation table unit 17. The table unit 11 has the base unit 100 attached thereto and moves the base unit 100 on the bed 10.

The Y-axis slide unit 15 moves the X-axis slide unit 16 in the Y-axis direction (a direction of an arrow 106) with respect to the bed 10. The X-axis slide unit 16 is fixed to a member corresponding to a movable part of the Y-axis slide unit 15. The X-axis slide unit 16 moves the rotation table unit 17 in the X-axis direction (a direction of an arrow 108) with respect to the Y-axis slide unit 15. The rotation table unit 17 is fixed to a member corresponding to a movable part of the X-axis slide unit 16 and supports the base unit 100. The rotation table unit 17 is, for example, an inclined circular table and includes a fixing base 17a, a rotation table 17b, an inclination table 17c, and a rotation table 17d. The fixing base 17a is fixed to a member corresponding to a movable part of the X-axis slide unit 16. The rotation table 17b is supported by the fixing base 17a. The rotation table 17b rotates about a rotation shaft 110 which is a rotation axis and is parallel to the Z-axis direction. The inclination table 17c is supported by the rotation table 17b. The inclination table 17c rotates about a rotation shaft 112 which is an axis and is orthogonal to a face supporting the rotation table 17b. The rotation table 17d is supported by the inclination table 17c. The rotation table 17d rotates about a rotation shaft 114 which is an axis and is orthogonal to a surface supporting the inclination table 17c. The rotation table 17d is used to fix the base unit 100. In this way, the rotation table unit 17 can rotate the base unit 100 about three orthogonal axes by rotating the components thereof about the rotation shafts 110, 112, and 114. The table unit 11 moves the base unit 100 fixed to the rotation table unit 17 in the Y-axis direction and the X-axis direction by the Y-axis slide unit 15 and the X-axis slide unit 16. Further, the table unit 11 rotates the base unit 100 about three orthogonal axes by rotating the components thereof about the rotation shafts 110, 112, and 114 by the rotation table unit 17. The table unit 11 may further move the base unit 100 in the Z-axis direction.

The deposition head 12 injects a powder material toward the base unit 100, irradiates the powder material injected onto the base unit with a laser beam to melt the powder, and solidifies the melted powder on the base unit 100 to form a formed layer. The powder which is introduced into the deposition head 12 is powder which is used as a raw material of the three-dimensional object. In the embodiment, for example, a metal material such as iron, copper, aluminum, or titanium can be used as the powder. As the powder, a material such as ceramic other than the metal material may be used. The deposition head 12 is provided at a position facing the upper face of the bed 10 in the Z-axis direction. The deposition head 12 faces the table unit 11. A lower part of the deposition head 12 in the Z-axis direction is provided with the nozzle 23. The nozzle 23 is attached to a main body 46 of the deposition head 12.

Figure 2:
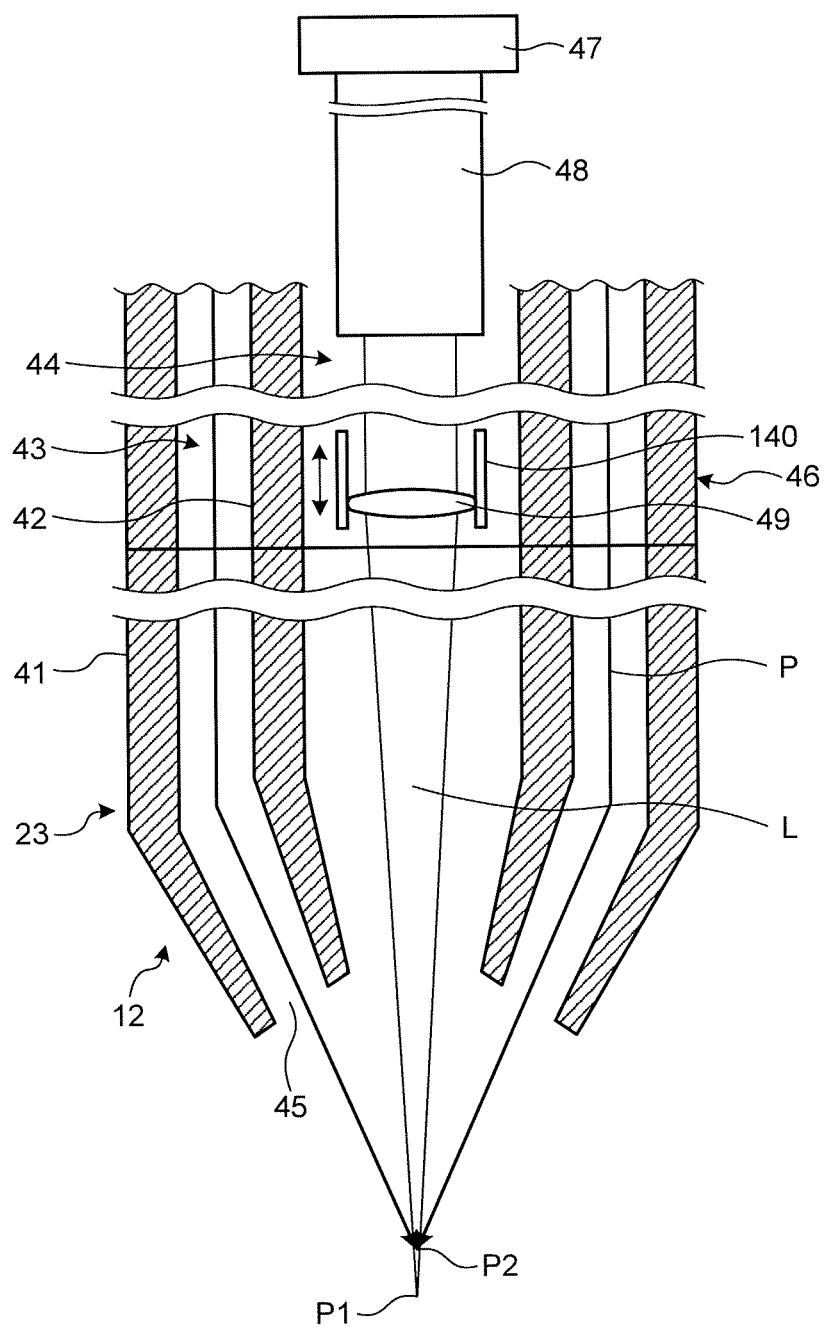
FIG. 2 is a cross-sectional view illustrating an example of a front end of a deposition head.

First, the nozzle 23 will be described with reference to FIG. 2. FIG. 2 is a cross-sectional view illustrating an example of the nozzle 23 of the deposition head 12. As illustrated in FIG. 2, the nozzle 23 is a double tube including an outer tube 41 and an inner tube 42 inserted into the outer tube 41. The outer tube 41 is a tubular member and is formed so that a diameter decreases as it goes toward a front end (the downside in the Z-axis direction). The inner tube 42 is inserted into the outer tube 41. The inner tube 42 is also a tubular member and has a shape in which a diameter decreases as it goes toward a front end (the downside in the Z-axis direction). In the nozzle 23, a gap between an inner periphery of the outer tube 41 and an outer periphery of the inner tube 42 is formed as a powder passage 43 through which a powder material (powder) P passes. An inner peripheral face side of the inner tube 42 is formed as a laser path 44 through which a laser beam passes. Here, the main body 46 to which the nozzle 23 is attached is a double tube similarly to the nozzle 23 and the powder passage 43 and the laser path 44 are formed in this way. In the deposition head 12, the powder passage 43 is disposed to surround the laser path 44. In the embodiment, the powder passage 43 is formed as a powder injection unit which injects powder. In the deposition head 12, the powder P which is introduced from the powder introduction unit 35 flows through the powder passage 43. The powder P is injected from a nozzle injection opening 45 which is an opening at an end side between the outer tube 41 and the inner tube 42.

Further, the deposition head 12 includes a light source 47, an optical fiber 48, and a light concentrating unit 49. The light source 47 outputs a laser beam L. The optical fiber 48 guides a laser beam L output from the light source 47 to the laser path 44. The light concentrating unit 49 is disposed at the laser path 44 and is disposed at the optical path of the laser beam L output from the optical fiber 48. The light concentrating unit 49 concentrates a laser beam L output from the optical fiber 48. The laser beam L which is concentrated by the light concentrating unit 49 is output from the end of the inner tube 42.

The three-dimensional deposition device 1 includes a focal position adjustment unit 140. The focal position adjustment unit 140 moves the light concentrating unit 49 in a direction in which the laser beam L travels. The focal position adjustment unit 140 can adjust a focal position of the laser beam L by moving a position of the light concentrating unit 49 in a direction in which the laser beam L travels. Additionally, a mechanism that adjusts a focal distance of the light concentrating unit 49 can be used as the focal position adjustment unit 140. Further, in the three-dimensional deposition device 1, the Z-axis slide unit 4a is also used as one of the focal position adjustment units. The Z-axis slide unit 4a moves along with a focal position P1 of the laser beam L and a powder material injection position (for example, a focal position P2 of the injected powder material). The focal position adjustment unit 140 can also move the focal position P1 of the laser beam L to the focal position P2 to which the powder material is injected. The three-dimensional deposition device 1 can switch a control target in response to an adjustment target.

The deposition head 12 injects the powder P from the powder passage 43 and outputs the laser beam L from the laser path 44. The powder P injected from the deposition head 12 enters an area irradiated with the laser beam L output from the deposition head 12. The powder P is heated by the laser beam L. The powder P irradiated with the laser beam L is melted and reaches the base unit 100. The powder P which reaches the base unit 100 in a melted state is cooled and solidified. Accordingly, a formed layer is formed on the base unit 100.

Here, the deposition head 12 of the embodiment guides the laser beam L output from the light source 47 by the optical fiber 48, but an optical member other than the optical fiber may be used to guide the laser beam. Further, the light concentrating unit 49 may be provided at one of or both the main body 46 and the nozzle 23. Since the deposition head 12 of the embodiment can be processed effectively, the powder passage 43 ejecting the powder P and the laser path 44 irradiated with the laser beam L are provided coaxially. However, the deposition head 12 is not limited thereto. The deposition head 12 may be formed so that an assembly for injecting the powder P and an assembly for emitting the laser beam L are provided as separate members. The deposition head 12 of the embodiment irradiates a powder material with a laser beam, but may emit a light beam other than the laser beam as long as the powder material can be melted or sintered.

Figure 3:
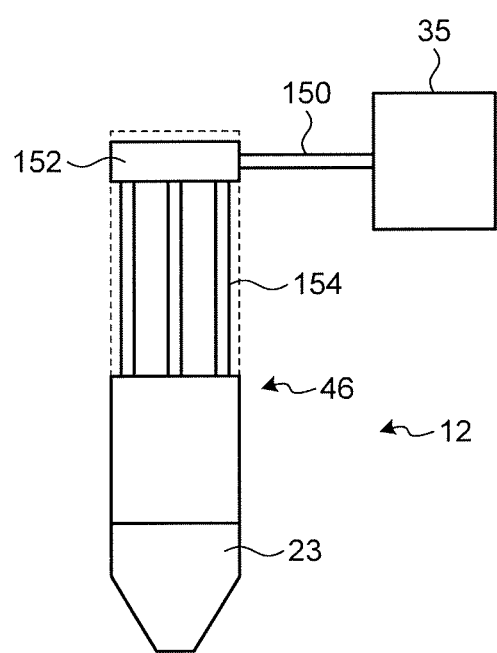
FIG. 3 is a schematic diagram illustrating a schematic configuration of a structure that supplies a powder material of the deposition head.
Figure 4:
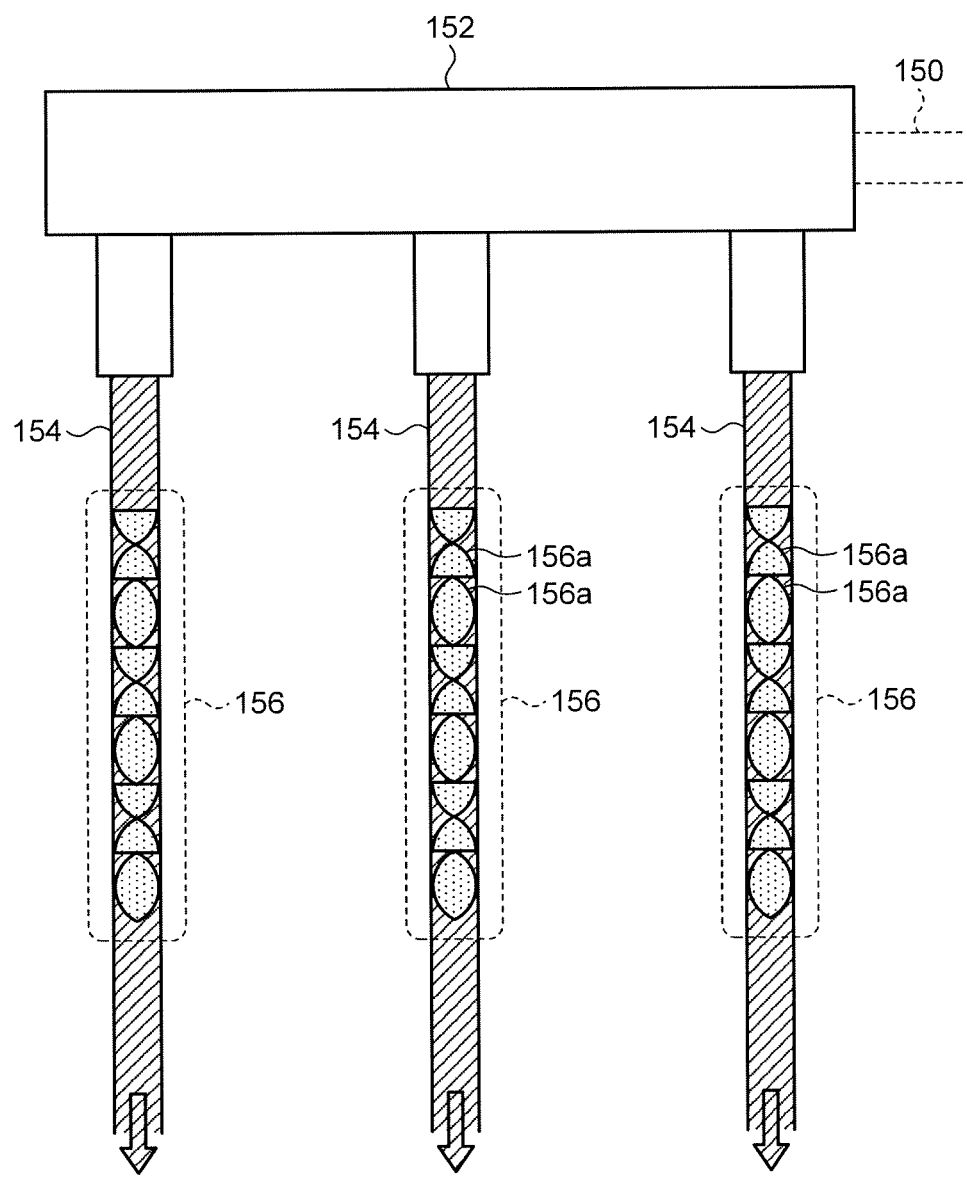
FIG. 4 is a development diagram illustrating a schematic configuration of a branch tube and a distribution unit of the deposition head.
Figure 5:
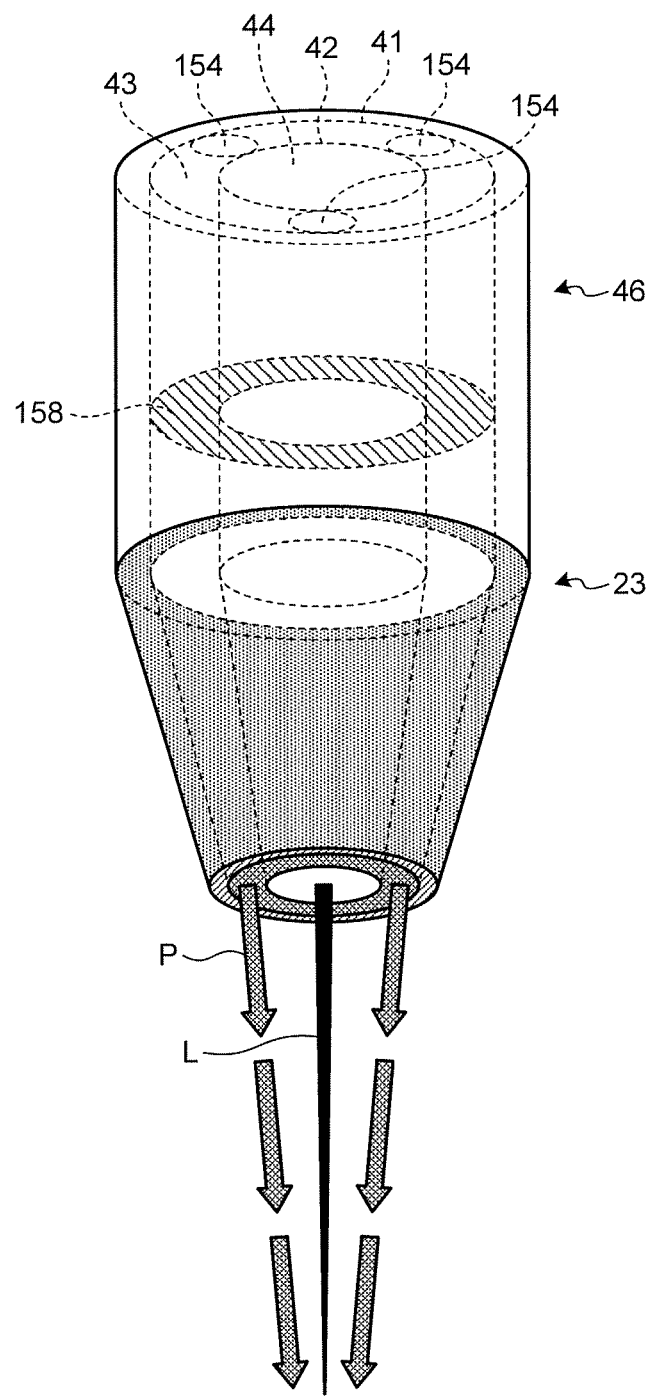
FIG. 5 is a perspective view illustrating a schematic configuration of a structure that supplies a powder material in the periphery of a nozzle of the deposition head.
Figure 6:
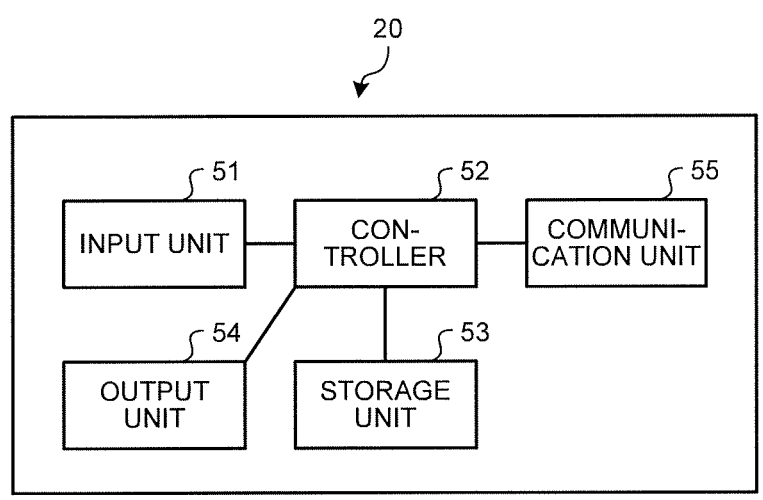
FIG. 6 is a schematic diagram illustrating a configuration of a control device.
Figure 7:
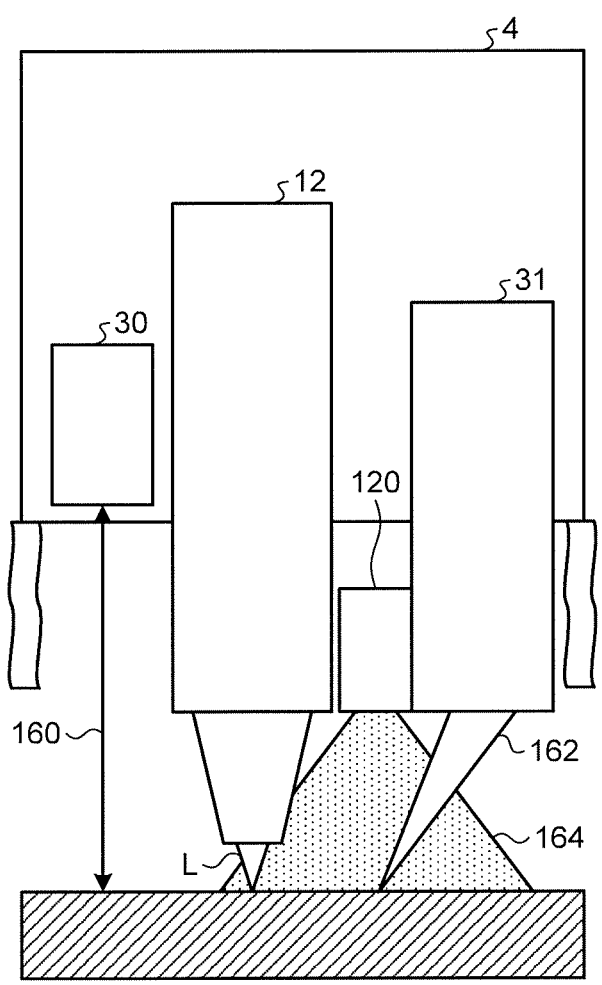
FIG. 7 is a schematic diagram illustrating a schematic configuration of each component provided in a deposition head accommodation chamber.

Next, a supply path of the powder material of the deposition head 12 will be described in more detail. FIG. 3 is a schematic diagram illustrating a schematic configuration of a structure that supplies the powder material of the deposition head. FIG. 4 is a development diagram illustrating a schematic configuration of a branch tube and a distribution unit of the deposition head. FIG. 5 is a perspective view illustrating a schematic configuration of a structure that supplies the powder material in the periphery of the nozzle of the deposition head. FIG. 6 is a schematic diagram illustrating a schematic configuration of a mixing unit. FIG. 7 is an explanatory diagram illustrating a change in cross-section of the mixing unit. As illustrated in FIG. 3, the powder material is supplied from the powder introduction unit 35 to the deposition head 12 through a powder supply tube 150. The deposition head 12 includes a distribution unit 152 and a plurality of branch tubes 154 as a mechanism that supplies the supplied powder material to the powder passage 43.

The distribution unit (distributor) 152 equalizes the powder supplied from the powder supply tube 150 and supplies the powder to the branch tube 154. The plurality of branch tubes 154 are tubes which connect the distribution unit 152 and the powder passage 43 to each other and supply the powder P supplied from the distribution unit 152 to the powder passage 43. In the deposition head 12 of the embodiment, as illustrated in FIG. 5, three branch tubes 154 are disposed equally, that is, at an interval of 120° in a circumferential direction.

A mixing unit 156 is provided inside the branch tube 154. The mixing unit 156 is an mechanism that equalizes the powder P flowing through the branch tube 154 inside the branch tube 154 and includes a plurality of stirring plates 156a. The stirring plate 156a is twisted about an axial direction of the branch tube 154 along a flow direction of the branch tube 154. Further, the stirring plates 156a which are adjacent to each other in the flow direction are twisted in the opposite directions. Accordingly, a flow of a fluid passing through the mixing unit 156 changes in response to an axial position of the branch tube 154. Thus, a stirring operation is promoted. Further, in the embodiment, three branch tubes 154 are provided, but the number is not particularly limited. It is desirable to equally dispose the branch tubes 154 at a predetermined angular interval in the circumferential direction.

Further, the deposition head 12 is formed so that a flow straightening device 158 is provided in the powder passage 43. The flow straightening device 158 straightens a flow of the powder material supplied from three branch tubes 154. Accordingly, the deposition head 12 can arrange the flow of the powder material injected from the powder passage 43 and thus supply the powder material to a desired position with high accuracy.

The machining unit 13 is used to machine, for example, a formed layer or the like. As illustrated in FIG. 1, the machining unit 13 is provided at a position facing the upper face of the bed 10 in the Z-axis direction and faces the table unit 11. The tool 22 is attached to a lower part of the machining unit 13 in the Z-axis direction. Additionally, the machining unit 13 may be provided in the movable range of the base unit 100 using the table unit 11 above the bed 10 in the Z-axis direction. Here, the arrangement position is not limited to the position of the embodiment.

FIG. 6 is a schematic diagram illustrating a configuration of the control device 20. The control device 20 is electrically connected to the components of the three-dimensional deposition device 1 and controls the operations of the components of the three-dimensional deposition device 1. The control device 20 is provided at the outside of the three-dimensional deposition chamber 2 or the spare chamber 3. The control device 20 includes, as illustrated in FIG. 6, an input unit 51, a controller 52, a storage unit 53, an output unit 54, and a communication unit 55. The components of the input unit 51, the controller 52, the storage unit 53, the output unit 54, and the communication unit 55 are electrically connected to one another.

The input unit 51 is, for example, an operation panel. An operator inputs information or an instruction to the input unit 51. The controller 52 includes, for example, a CPU (Central Processing Unit) and a memory. The controller 52 outputs an instruction for controlling the operations of the components of the three-dimensional deposition device 1 to the components of the three-dimensional deposition device 1. Further, information is input to the controller 52 from the components of the three-dimensional deposition device 1. The storage unit 53 is, for example, a storage device such as a RAM (Random Access Memory) or a ROM (Read Only Memory). The storage unit 53 stores an operation program for the three-dimensional deposition device 1 controlling the operations of the components by the controller 52 executing the program, information of the three-dimensional deposition device 1, or design information of the three-dimensional object. The output unit 54 is, for example, a display. The output unit 54 displays, for example, information of the components of the three-dimensional deposition device 1. The communication unit 55 exchanges information with, for example, a communication line such as the Internet or a LAN (Local Area Network) by communicating with the communication line. Additionally, the control device 20 may include at least the controller 52 and the storage unit 53. The control device 20 may output an instruction to the components of the three-dimensional deposition device 1 if the controller 52 and the storage unit 53 are provided.

The shape measurement unit 30 is fixed to the deposition head accommodation chamber 4. The shape measurement unit 30 is disposed adjacent to the deposition head 12. The shape measurement unit 30 measures a surface shape of the formed layer formed on the base unit 100. As the shape measurement unit 30, for example, a 3D scanner or a device measuring a relative distance can be used. For example, the shape measurement unit 30 performs scanning the surface of the formed layer on the base unit 100 by a laser beam to calculate position information (distance of arrow 160) of the surface of the formed layer from reflected light. The shape measurement unit then measures the surface shape of the formed layer. Further, in the embodiment, the shape measurement unit 30 is attached to the deposition head accommodation chamber 4. However, the shape measurement unit 30 may be attached to a different position as long as the surface shape of the formed layer formed on the base unit 100 can be measured.

FIG. 7 is a schematic diagram illustrating a schematic configuration of components provided in the deposition head accommodation chamber. The heating head 31 heats the base unit 100, the formed layer on the base unit 100, the melted powder P, or the like. As illustrated in FIGS. 1 and 7, the heating head 31 is disposed adjacent to the deposition head 12 and selectively heats an upstream part (a part before processed) of an area to be processed by the deposition head 12 or a downstream part (a part after processed) of an area to be processed by the deposition head 12 thereof. The heating head 31 is fixed to the deposition head accommodation chamber 4. The heating head 31 is disposed adjacent to the deposition head 12. The heating head 31 heats the base unit 100, the formed layer, the melted powder P (a molten body A), the solid body B, and the like by emitting a laser beam 162 thereto. Since the heating head 31 heats the formed layer or the melted powder P, a temperature of the formed layer or the melted powder P can be controlled. Therefore, it is possible to suppress an abrupt decrease in temperature of the formed layer or the melted powder P or to form an atmosphere (a high-temperature environment) in which the powder P is easily melted. Further, the heating head 31 can heat the formed layer or the base unit 100 before the molten body A is adhered, that is, before the formed layer is formed by the deposition head 12.

Figure 8:
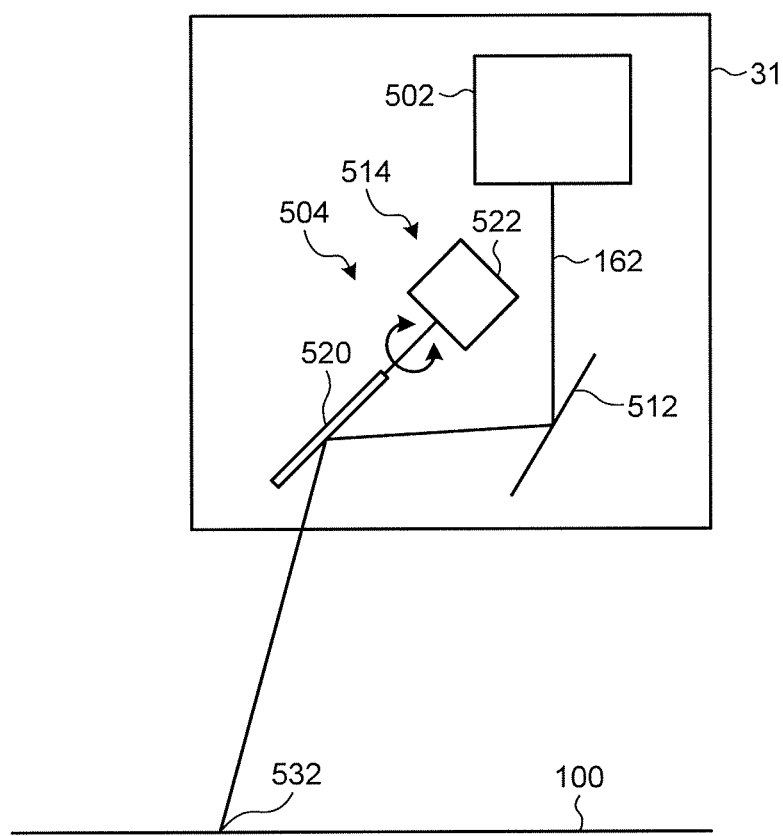
FIG. 8 is a schematic diagram illustrating a schematic configuration of a heating head.
Figure 9:
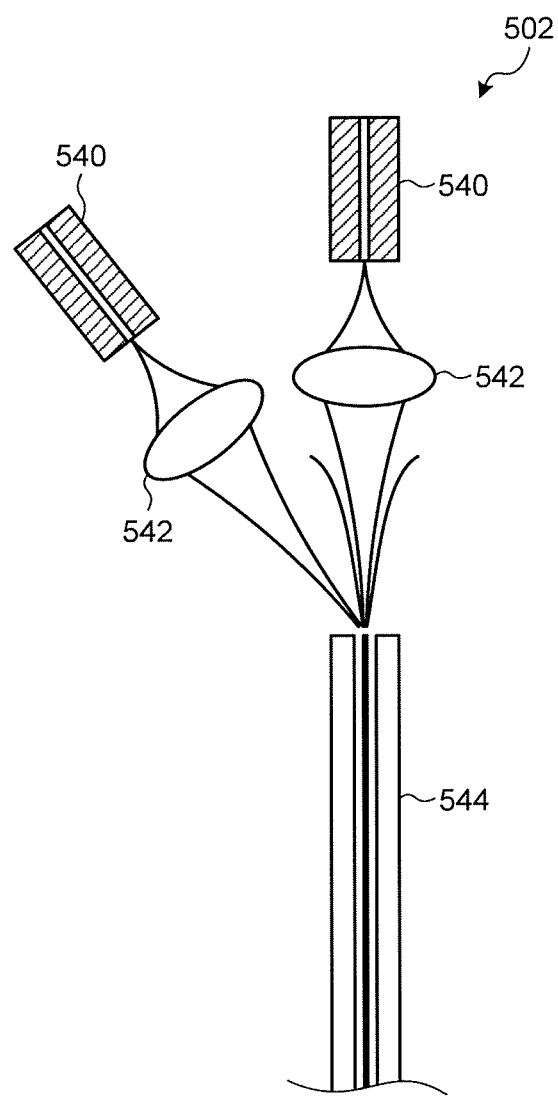
FIG. 9 is a schematic diagram illustrating a schematic configuration of a light source unit of the heating head.
Figure 10:
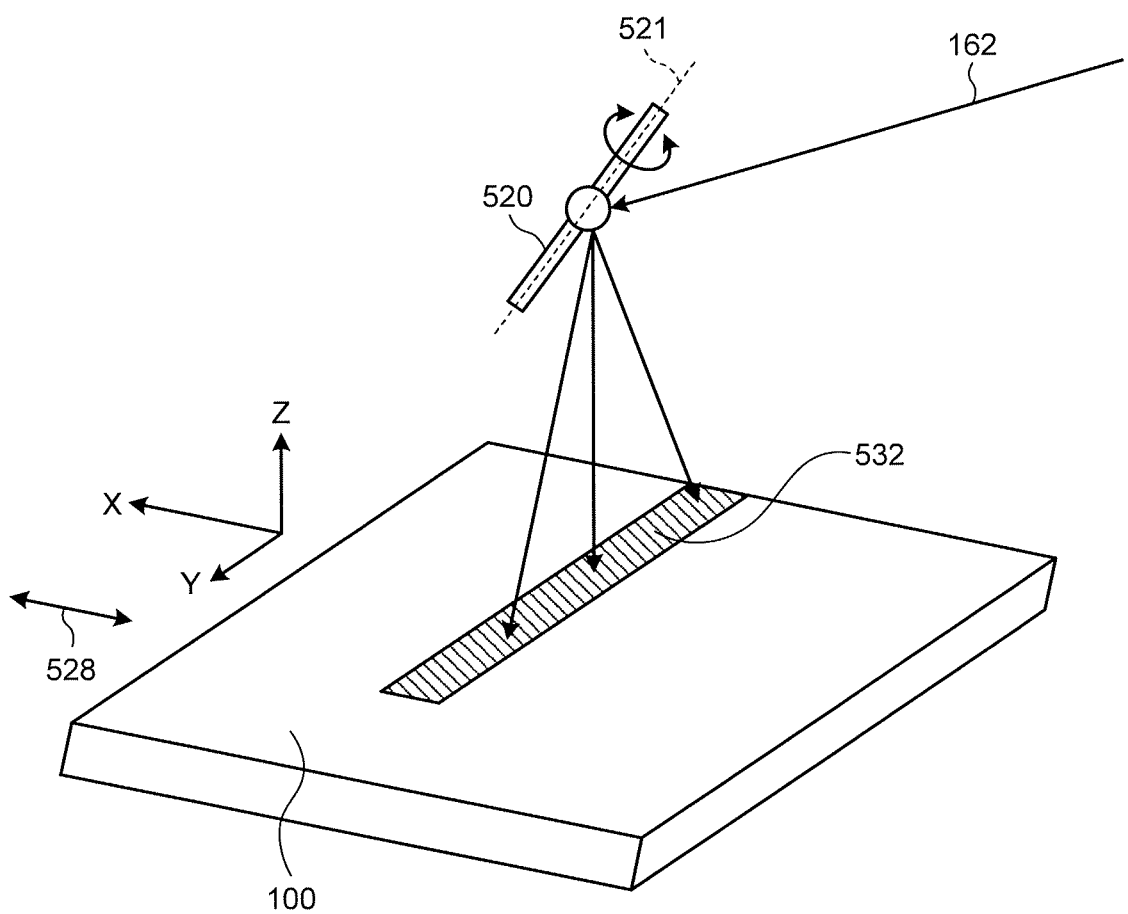
FIG. 10 is a perspective view illustrating a schematic configuration of the heating head.

An example of the heating head 31 will be described with reference to FIGS. 8 to 10. FIG. 8 is a schematic diagram illustrating a schematic configuration of the heating head. FIG. 9 is a schematic diagram illustrating a schematic configuration of a light source unit of the heating head. FIG. 10 is a perspective view illustrating a schematic configuration of the heating head. The heating head 31 includes a light source unit 502 and a heating position adjustment mechanism 504.

The light source unit 502 outputs the laser beam 162 used to heat the formed layer or the base unit 100. As illustrated in FIG. 9, the light source unit 502 includes two semiconductor lasers 540, two light concentrating units 542, and an optical fiber 544. Two semiconductor lasers 540 respectively output the laser beam. The light concentrating unit 542 is provided in each of the semiconductor lasers 540 and concentrates the laser output from the semiconductor laser 540. The laser beam which is concentrated by each of two light concentrating units 542 is incident to the optical fiber 544. The optical fiber 544 outputs the laser beam incident thereto toward the heating position adjustment mechanism 504.

The light source unit 502 concentrates the light which is incident from two semiconductor lasers 540 by the light concentrating unit 542 and causes the light to be incident to one optical fiber 544. Accordingly, the laser beam 162 obtained by multiplexing (joining) the laser beams output from two semiconductor lasers 540 is output from the light source unit 502. Further, in the embodiment, the laser beams of two semiconductor lasers 540 are joined. However, the number of the semiconductor lasers is not limited to two and may be one to three or more. The light source unit 502 can increase the output of the laser beam 162 when the number of the semiconductor lasers is increased.

The heating position adjustment mechanism 504 includes a mirror 512 and a galvano mirror 514. The heating position adjustment mechanism 504 irradiates an area 532 of the base unit 100 with the laser beam by reflecting the laser beam 162 output from the light source unit 502 through the mirror 512 and reflecting the laser beam through the galvano mirror 514 so that a direction is changed. The galvano mirror 514 includes a mirror 520 and an angular position adjustment mechanism 522 which rotates the mirror 520 about a rotation axis 521 to change a direction of the mirror 520. When the galvano mirror 514 rotates the mirror 520 about the rotation axis 521, a position irradiated with the laser beam 162 on a surface of the base unit 100 can be moved in a direction of the mirror 520 as illustrated in FIG. 10. In the embodiment, the position irradiated with the laser beam 162 can be moved in a range of the area 532. The heating position adjustment mechanism 504 can perform a laser beam scanning operation by rotating the mirror 520 at a predetermined speed pattern in the galvano mirror 514. The heating position adjustment mechanism 504 performs a laser beam scanning operation in a direction orthogonal to a direction of an arrow 528 which is the relative movement directions of the base unit 100 or the formed layer and the heating head 31. Accordingly, the area 532 is formed so that a direction orthogonal to the arrow 528 becomes a longitudinal direction. Further, a direction in which the laser beam is moved by the heating position adjustment mechanism 504 is not limited thereto and may be set to an arbitrary direction if necessary. The heating position adjustment mechanism 504 can adjust the laser beam movement direction by adjusting, for example, a direction of the rotation axis 521 of the galvano mirror 514.

The heating head 31 heats the base unit 100 or the formed layer in the area 532 by moving the laser beam 162 output from the light source unit 502 through the heating position adjustment mechanism 504. The heating head 31 can adjust a heating position of the base unit 100 with high accuracy by moving the laser beam irradiation position and thus perform a heating operation with high accuracy.

The heating head 31 can output a laser beam having a short wavelength by using the semiconductor laser 540 as a laser beam source and thus increase an energy absorption degree for the base unit 100, the formed layer, and the like. Accordingly, a heating operation can be performed effectively. Since the heating operation can be performed effectively, an oscillator can be decreased in size and thus the light source unit 502 can be decreased in size. Further, in the above-described embodiment, since a decrease in size of the device can be realized, the light source unit 502 is disposed inside a casing of the heating head 31, but may be disposed outside the casing.

Here, it is desirable that the light source unit of the heating head use a vertical cavity surface emitting laser (VCSEL) outputting a beam in a direction perpendicular to a substrate face as a laser beam source.

Figure 11:
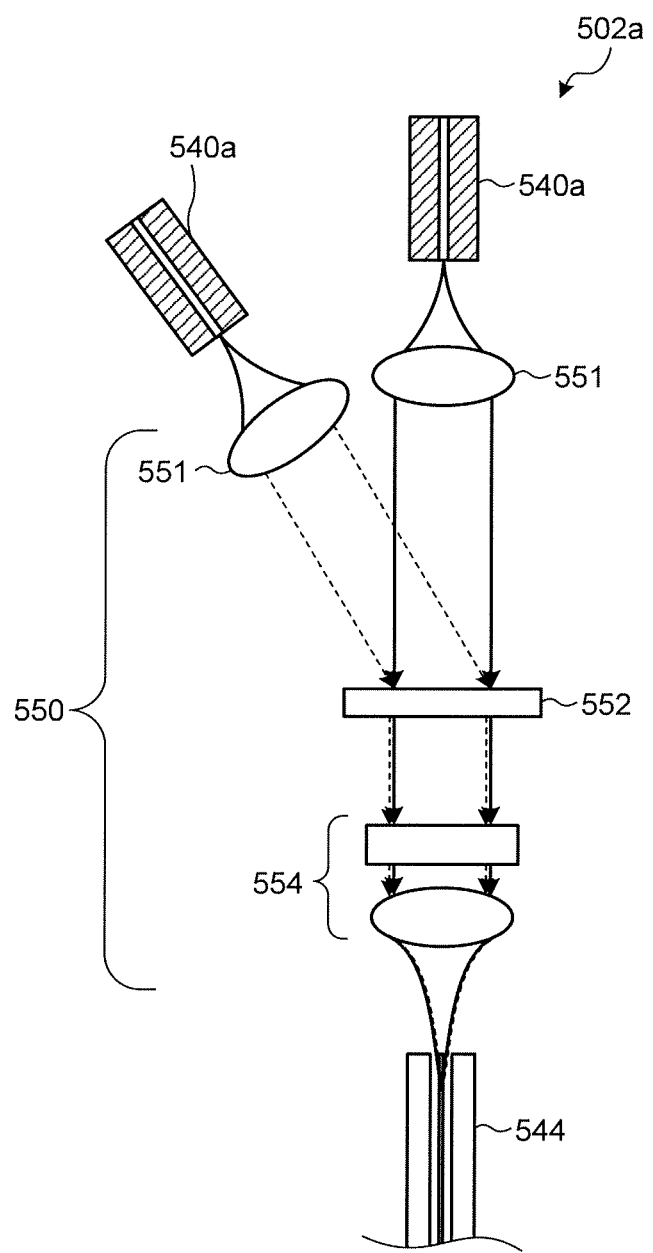
FIG. 11 is a schematic diagram illustrating schematic configuration of another example of the light source unit of the heating head.

FIG. 11 is a schematic diagram illustrating a schematic configuration of another example of the light source unit of the heating head. A light source unit 502a includes two semiconductor lasers 540a, a multiplexing unit 550, and the optical fiber 544. The multiplexing unit 550 includes two collimating lenses 551, a diffraction grating 552, and a light concentrating unit 554. Each of two semiconductor lasers 540*a* outputs a laser beam. The semiconductor laser 540*a* is a vertical cavity surface emitting laser. The collimating lens 551 is provided in each semiconductor laser 540*a* and collimates the laser output from the semiconductor laser 540*a*. The laser beam which is collimated by two collimating lenses 551 is incident to the diffraction grating 552. The diffraction grating 552 diffracts at least one of the laser beams incident from two different directions to obtain the laser beam in the same direction. The light concentrating unit 554 concentrates the laser beam having passed through the diffraction grating 552 and causes the laser beam to be incident to the optical fiber 544. The laser beam which is concentrated by the light concentrating unit 554 is incident to the optical fiber 544. The optical fiber 544 outputs the incident laser beam toward the heating position adjustment mechanism 504.

Since the light source unit 502*a* uses the vertical cavity surface emitting laser, the light source unit can be further decreased in size. Further, in the above-described embodiment, the laser beam is incident to the optical fiber, but the optical fiber may not be used.

Figure 12:
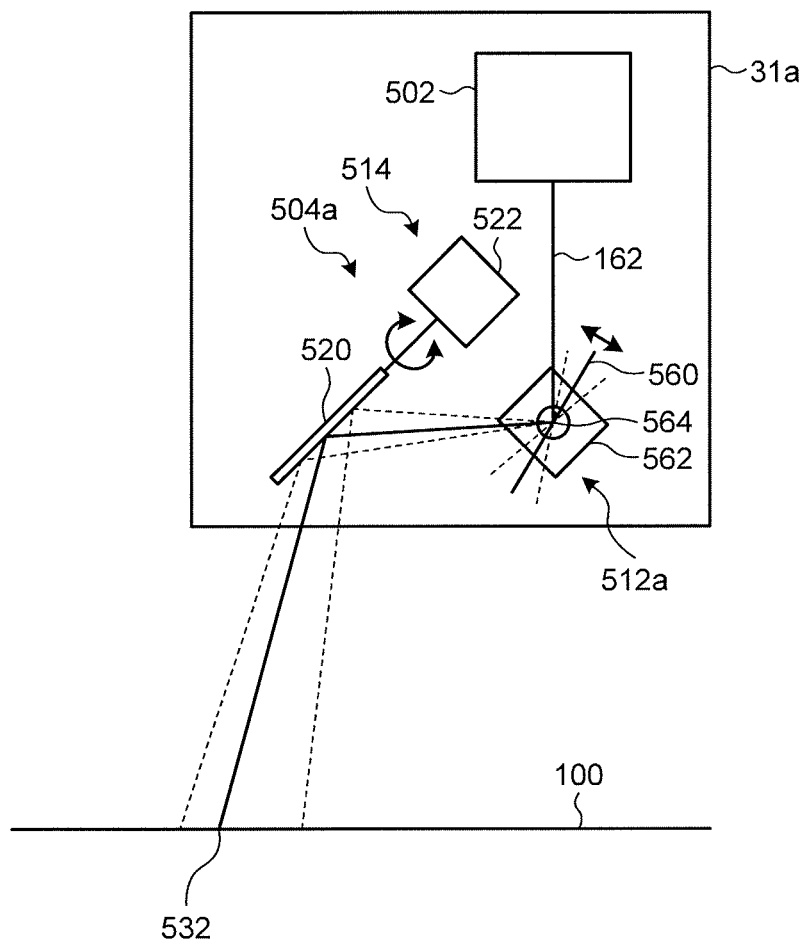
FIG. 12 is a schematic diagram illustrating a schematic configuration of another example of the heating head.

Further, the heating head of the above-described embodiment can perform a scanning operation in one axis direction, but the heating head enables the laser beam is scanned in a multi-axis direction. FIG. 12 is a schematic diagram illustrating a schematic configuration of another example of the heating head. A heating head 31*a* illustrated in FIG. 12 includes the light source unit 502 and a heating position adjustment mechanism 504*a*. The heating position adjustment mechanism 504*a* includes a galvano mirror 512*a* instead of the mirror 512 of the heating position adjustment mechanism 504.

The heating position adjustment mechanism 504*a* includes the galvano mirror 512*a* and the galvano mirror 514. The heating position adjustment mechanism 504*a* irradiates the area 532 of the base unit 100 with the laser beam by reflecting the laser beam 162 output from the light source unit 502 through the galvano mirror 512*a* and reflecting the laser beam through the galvano mirror 514 so that a direction is changed. The galvano mirror 512*a* includes a mirror 560 and an angular position adjustment mechanism 562 which rotates the mirror 560 about a rotation axis 564 so that a direction of the mirror 560 is changed. Here, the rotation axis 564 is an axis different from the rotation axis 521. When the galvano mirror 512*a* rotates the mirror 562 about the rotation axis 564, a position of the laser beam 162 reaching the galvano mirror 520 can be moved by a direction of the mirror 560 as illustrated in FIG. 12.

The heating position adjustment mechanism 504*a* changes the position of the laser beam reaching the mirror 520 by rotating the mirror 560 of the galvano mirror 512*a*, and changes the position of the laser beam reaching the base unit 100 by rotating the mirror 520 of the galvano mirror 514. The heating position adjustment mechanism 504*a* then can move a position of the laser beam reaching the base unit 100 two-dimensionally. In this way, the heating head 31*a* can adjust an irradiation position of the laser beam 162 in two dimensions by moving the irradiation position on the surface of the base unit 100 in a two-axis direction. Accordingly, the heating head 31*a* can adjust a heating position on the base unit 100 with higher accuracy and thus perform a heating operation with higher accuracy.

Further, the heating head 31*a* of the embodiment heats a target area by emitting the laser beam thereto, but the invention is not limited thereto. As long as the heating head 31*a* can selectively heat the heating area, light other than a laser beam, for example, a light beam of infrared light may be used to heat the heating area or the heating area may be irradiated with an electromagnetic wave to heat the heating area.

The temperature detection unit 120 is disposed near the heating head 31. As illustrated in FIG. 7, the temperature detection unit 120 measures a temperature by outputting a measurement wave 164 to a area including a position irradiated with the laser beam L and an area irradiated with the laser beam 162 output from the heating head 31. As the temperature detection unit 120, various temperature sensors that measure a temperature of a surface provided with a formed layer can be used.

The weight detection unit 130 detects a weight of the base unit 100 attached to the rotation table 17*d* of the rotation table unit 17. A load cell can be used as the weight detection unit 130.

Figure 13:
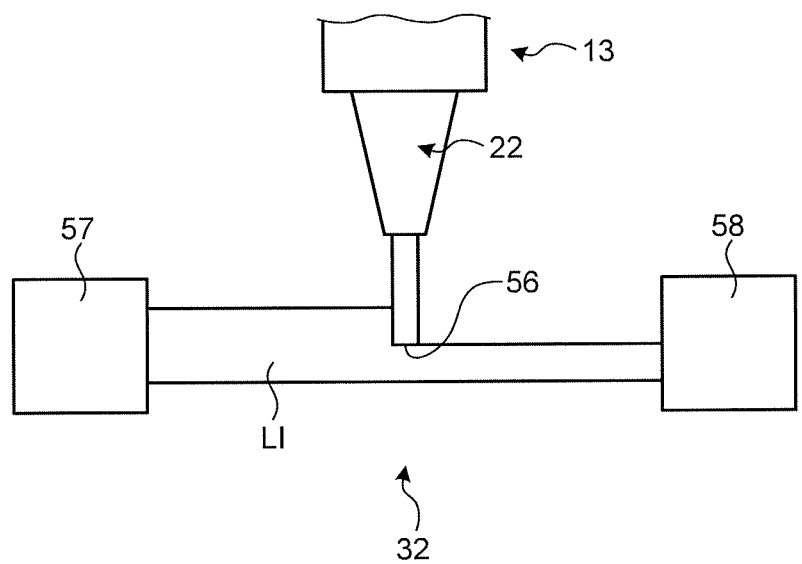
FIG. 13 is a schematic diagram illustrating an example of a machining measurement unit.

The machining measurement unit 32 measures a position of a front end 56 of the tool 22 of the machining unit 13. FIG. 13 is a schematic diagram illustrating an example of the machining measurement unit 32. As illustrated in FIG. 13, the machining measurement unit 32 includes a light source unit 57 and an image capturing unit 58. In the machining measurement unit 32, the front end 56 of the tool 22 of the machining unit 13 is located between the light source unit 57 and the image capturing unit 58. The light source unit 57 is, for example, an LED. The image capturing unit 58 is, for example, a CCD (Charge Coupled Device) camera. The machining measurement unit 32 irradiates the image capturing unit 58 with light LI from the light source unit 57 while the front end 56 of the tool 22 is disposed between the light source unit 57 and the image capturing unit 58. The machining measurement unit 32 then acquires an image by the image capturing unit 58. Accordingly, it is possible to acquire an image in which light is interrupted by the front end 56 of the tool 22. The machining measurement unit 32 can acquire a shape and a position of the front end 56 by analyzing the image acquired by the image capturing unit 58 and specifically detecting a boundary between a light incident position and a non-light incident position. The control device 20 detects an accurate position of the front end 56 of the tool 22 attached to the machining unit 13 based on the acquired position of the front end 56 of the tool 22 and a position of the machining unit 13 (a position of the machining unit accommodation chamber 5). Additionally, the machining measurement unit 32 is not limited to this configuration as long as measuring the position of the front end 56 of the machining unit 13. For example, the front end may be measured by a laser beam.

The tool exchange unit 33 is disposed inside the three-dimensional deposition chamber 2. The tool exchange unit 33 exchanges the tool 22 attached to the machining unit 13. The tool exchange unit 33 moves a part which does not grip the tool 22 to a position facing the machining unit 13. Subsequently, the tool exchange unit 33 moves a part which does not grip the tool 22 to a position facing the machining unit 13. Subsequently, the tool exchange unit separates the tool 22 attached to the machining unit 13. Then, the tool exchange unit moves a part which grips a different tool 22 to be attached to the machining unit 13 to a position facing the machining unit 13 and attaches the different tool 22 to the machining unit 13. In this way, the tool exchange unit 33 can exchange the tool 22 of the machining unit 13 by attaching or separating the tool 22 of the machining unit 13.

Additionally, the tool exchange unit 33 is not limited to this configuration as long as the tool 22 of the machining unit 13 can be exchanged.

The nozzle exchange unit 34 is disposed inside the three-dimensional deposition chamber 2. The nozzle exchange unit 34 exchanges the nozzle 23 attached to the deposition head 12. The nozzle exchange unit 34 can use the same structure as that of the tool exchange unit 33.

Figure 14A:
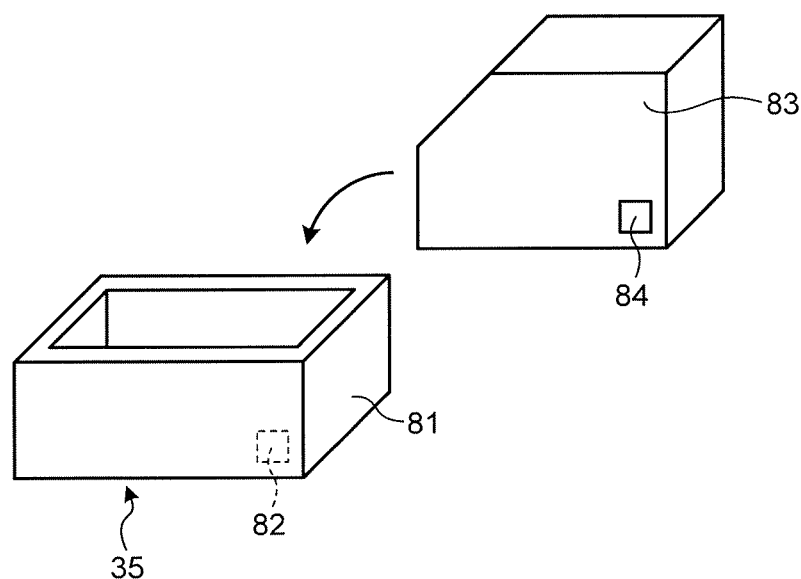
FIG. 14A is a schematic diagram illustrating an example of a powder introduction unit.
Figure 14B:
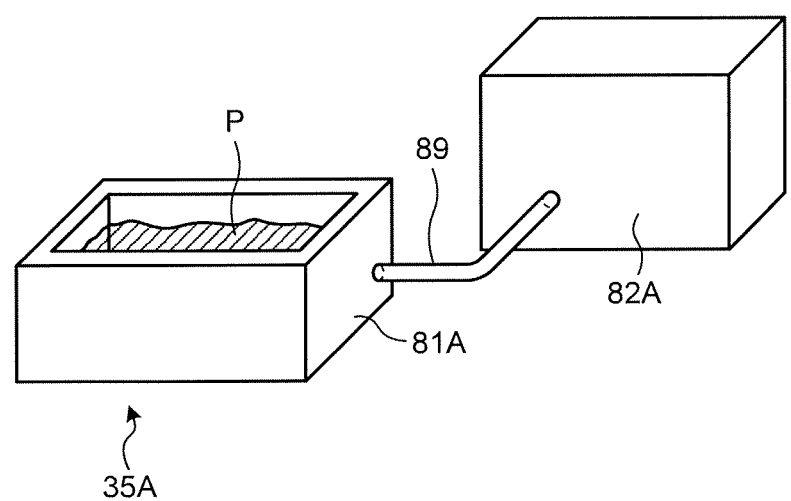
FIG. 14B is a schematic diagram illustrating an example of the powder introduction unit.

The powder introduction unit 35 introduces a powder material which becomes a raw material of a three-dimensional object to the deposition head 12. FIGS. 14A and 14B are schematic diagrams illustrating examples of the powder introduction unit. As illustrated in FIG. 14A, in the embodiment, the powder P is managed while being enclosed in a cartridge 83. That is, the powder is shipped while being enclosed in the cartridge 83 in accordance with, for example, the type of material. The cartridge 83 is provided with a material display part 84. The material display part 84 is, for example, a display which indicates powder information such as a material type. The material display part 84 is not limited to information which can be checked by eyes and may be an IC chip or a two-dimensional code or mark. This information can be acquired by a reader. The material display part 84 is not limited thereto as long as the type of powder can be displayed. The material display part 84 can indicate, for example, powder information necessary for manufacturing the three-dimensional object such as a particle size, a weight, purity of powder or an oxide coating of powder other than the type of powder. Further, the material display part 84 may include information which indicates whether the powder is a regular product.

The powder introduction unit 35 includes a powder storage unit 81 and a powder identification unit 82. The powder storage unit 81 is, for example, a box-shaped member and accommodates the cartridge 83 therein. The powder storage unit 81 is connected to a carrying air supply part which carries out the powder or a carrying path through which the powder is carried to the deposition head 12. The powder storage unit 81 introduces the powder stored in the cartridge 83 into the deposition head 12 when the cartridge 83 is accommodated therein. When the powder identification unit 82 detects a state where the cartridge 83 is accommodated in the powder storage unit 81, the material display part 84 of the cartridge 83 is read so that the information of the powder stored in the cartridge 83 is read. The powder introduction unit 35 can supply known powder to the deposition head 12 by acquiring the powder information by the powder identification unit 82.

Here, the powder introduction unit 35 may supply a powder which is not managed while being enclosed in the cartridge 83 to the deposition head 12. FIG. 14B illustrates a powder introduction unit 35A in which the powder is not enclosed in the cartridge 83. The powder introduction unit 35A includes a powder storage unit 81A, a powder identification unit 82A, and a powder guide tube 89 which connects the powder storage unit 81A and the powder identification unit 82A to each other. The powder storage unit 81A is, for example, a box-shaped member and stores the powder P therein. The powder identification unit 82A analyzes the powder supplied through the powder guide tube 89 and measures the powder information necessary for manufacturing the three-dimensional object such as a particle size, a weight, purity of powder or an oxide coating of powder. As the powder identification unit 82A, a spectral analysis device which identifies a powder material by a spectral analysis, a particle size analysis device which measures a powder particle size by a particle size analysis, and a weight measurement device which measures a powder weight can be used. The powder identification unit 82A measures powder purity from, for example, the type, the particle size, and the weight of the powder measured as described above. Further, the powder identification unit 82A measures the oxide coating of the powder by, for example, conductivity. The powder introduction unit 35A also can supply known powder to the deposition head 12 by acquiring the powder information by the powder identification unit 82A.

The base movement unit 36 is disposed in the spare chamber 3. The base movement unit 36 moves a base unit 100a from the inside of the spare chamber 3 into the three-dimensional deposition chamber 2 and moves the base unit 100 inside the three-dimensional deposition chamber 2 into the spare chamber 3. The base unit 100a which is carried into the spare chamber 3 from the outside is attached to the base movement unit 36. The base movement unit 36 carries the base unit 100a attached thereto from the spare chamber 3 into the three-dimensional deposition chamber 2. More specifically, the base movement unit 36 moves the base unit 100a attached to the base movement unit 36 into the three-dimensional deposition chamber 2 so that the base unit is attached to the rotation table unit 17. The base movement unit 36 moves the base unit 100 by, for example, a robot arm or an orthogonal carrying device.

The air discharge unit 37 is, for example, a vacuum pump and discharges air inside the three-dimensional deposition chamber 2. The gas introduction unit 38 introduces a gas having a predetermined element, for example, an inert gas such as argon and nitrogen into the three-dimensional deposition chamber 2. The three-dimensional deposition device 1 discharges the air of the three-dimensional deposition chamber 2 by the air discharge unit 37 and introduces a gas into the three-dimensional deposition chamber 2 by the gas introduction unit 38. Accordingly, the three-dimensional deposition device 1 can form a desired gas atmosphere inside the three-dimensional deposition chamber 2. Here, in the embodiment, the gas introduction unit 38 is provided below the air discharge unit 37 in the Z-axis direction. When the three-dimensional deposition device 1 uses argon having a specific weight higher than that of a gas such as oxygen in air as an introduction gas while the gas introduction unit 38 is provided below the air discharge unit 37 in the Z-axis direction, an argon gas can be appropriately charged into the three-dimensional deposition chamber 2. Additionally, when the introduction gas is set as a gas lighter than air, a pipe may be disposed in an opposite way.

The powder collection unit 39 collects the powder P which is injected from the nozzle injection opening 45 of the deposition head 12 and is not used to form a formed layer. The powder collection unit 39 suctions the air inside the three-dimensional deposition chamber 2 and collects the powder P included in the air. The powder P which is injected from the deposition head 12 is melted and solidified by the laser beam L so that a formed layer is formed. However, since a part of the powder P is not irradiated with, for example, the laser beam L, there is a case where the powder is left inside the three-dimensional deposition chamber 2. Further, chips which are cut by the machining unit 13 and are discharged from the formed layer are left in the three-dimensional deposition chamber 2. The powder collection unit 39 collects the powder P or chips left in the three-dimensional deposition chamber 2. The powder collection unit 39 may include an assembly such as a brush which mechanically collects the powder.

Figure 15:
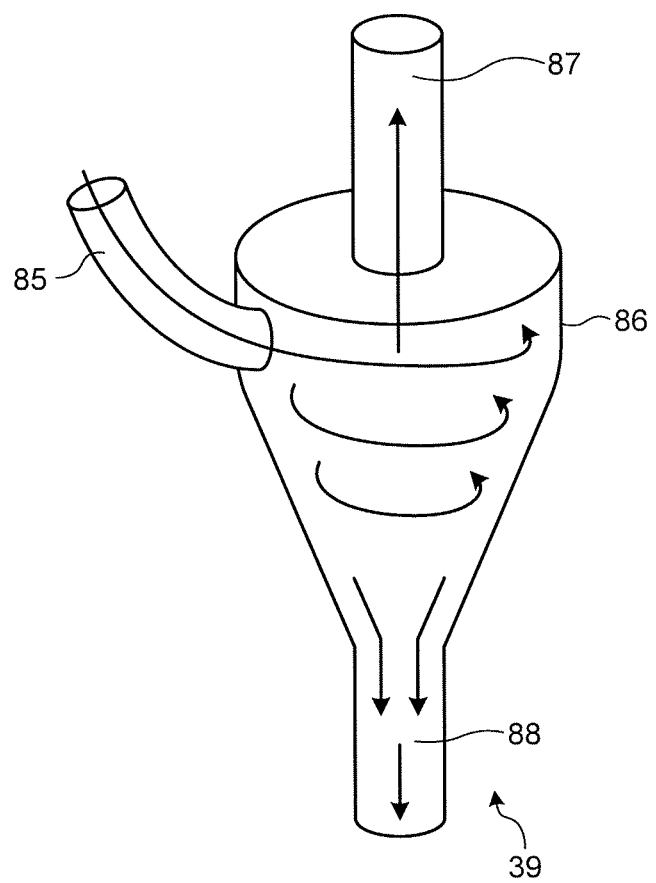
FIG. 15 is a schematic diagram illustrating an example of a powder collection unit.

FIG. 15 is a schematic diagram illustrating an example of the powder collection unit 39. As illustrated in FIG. 15, the powder collection unit 39 includes an introduction part 85, a cyclone part 86, a gas discharge part 87, and a powder discharge part 88. The introduction part 85 is, for example, a tubular member and one end thereof is connected to, for example, the inside of the three-dimensional deposition chamber 2. The cyclone part 86 is, for example, a hollow truncated conical member and is formed so that a diameter decreases as it goes downward in, for example, the vertical direction. The other end of the introduction part 85 is connected to the cyclone part 86 in a tangential direction of an outer periphery of the cyclone part 86. The gas discharge part 87 is a tubular member and one end thereof is connected to an upper end of the cyclone part 86 in the vertical direction. The powder discharge part 88 is a tubular member and one end thereof is connected to a lower end of the cyclone part 86 in the vertical direction.

For example, a pump which suctions a gas is connected to the other end of the gas discharge part 87. Thus, the gas discharge part 87 suctions a gas from the cyclone part 86 to form a negative pressure in the cyclone part 86. Since the cyclone part 86 has a negative pressure, the introduction part 85 suctions a gas from the three-dimensional deposition chamber 2. The introduction part 85 suctions the powder P which is not used to form the formed layer along with the gas inside the three-dimensional deposition chamber 2. The introduction part 85 is connected to the cyclone part 86 in the tangential direction of the outer periphery of the cyclone part 86. Thus, the gas and the powder P which are suctioned to the introduction part 85 turn along an inner periphery of the cyclone part 86. Since the powder P has a specific weight higher than that of the gas, the powder is centrifugally separated outward in a radiation direction at the inner periphery of the cyclone part 86. The powder P is directed toward the lower powder discharge part 88 in an extension direction by the own weight and is discharged from the powder discharge part 88. Further, the gas is discharged by the gas discharge part 87.

The powder collection unit 39 collects the powder P which is not used to form the formed layer in this way. Further, the powder collection unit 39 of the embodiment may separately collect the powder P in accordance with each specific weight. For example, since the powder having a low specific weight has a small weight, the powder is not directed toward the powder discharge part 88 and is suctioned to the gas discharge part 87. Thus, the powder collection unit 39 can separately collect the powder P in accordance with the specific weight. Additionally, the powder collection unit 39 is not limited to such a configuration as long as the powder P which is not used to form the formed layer can be collected.

Figure 16:
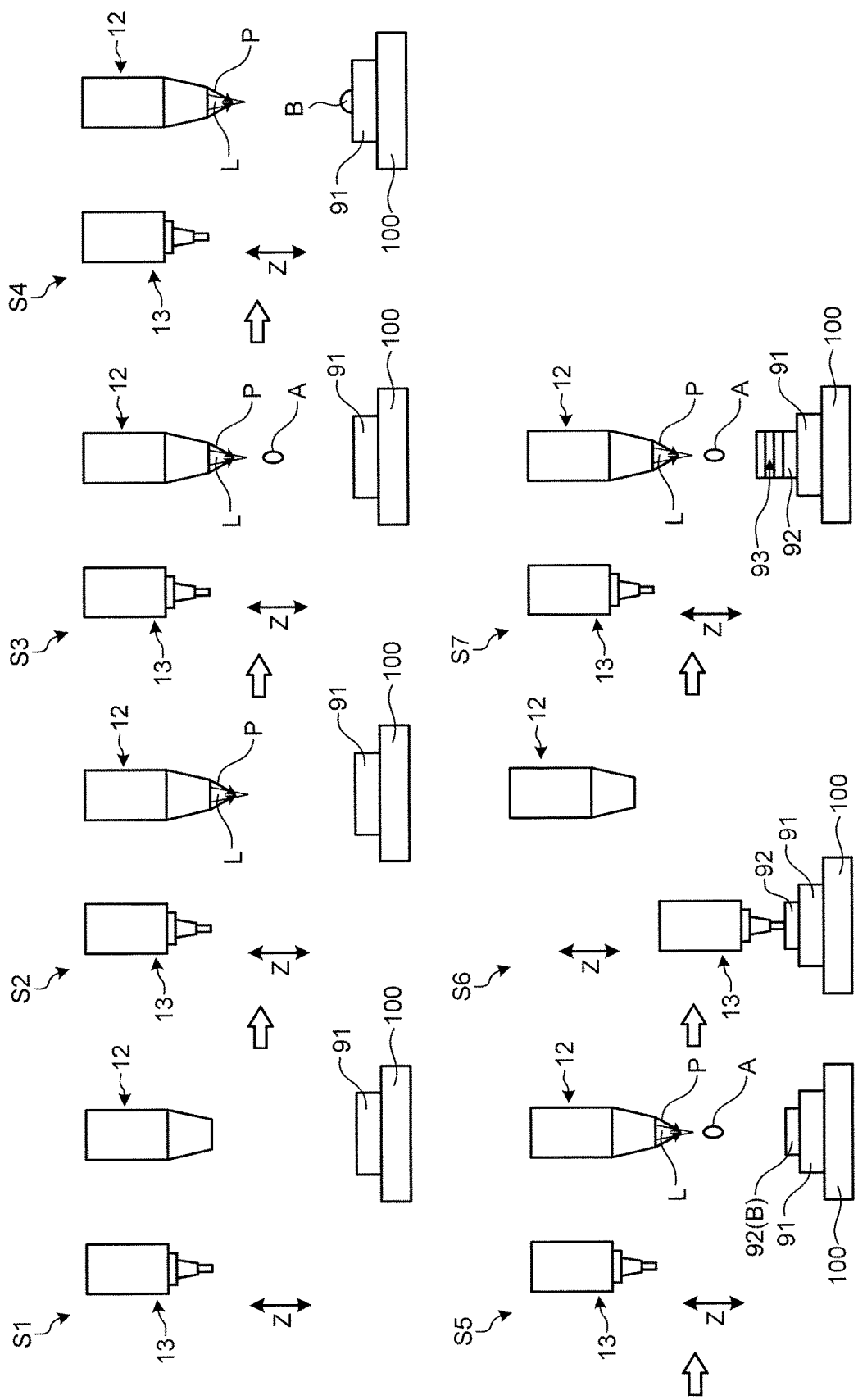
FIG. 16 is an explanatory diagram illustrating a three-dimensional object manufacturing method by the three-dimensional deposition device according to the embodiment.

Next, a three-dimensional object manufacturing method using the three-dimensional deposition device 1 will be described. FIG. 16 is a schematic diagram illustrating the three-dimensional object manufacturing method by the three-dimensional deposition device 1 according to the embodiment. The manufacturing method illustrated in FIG. 16 can be performed by the control to the operations of the components of the control device 20. In the embodiment, a case will be described in which a three-dimensional object is manufactured on a pedestal 91. The pedestal 91 is, for example, a metallic plate-shaped member, but the shape and the material thereof may be arbitrarily set as long as the three-dimensional object is formed thereon. The pedestal 91 is attached on the base unit 100. The base unit 100 is fixed to the rotation table unit 17 of the table unit 11 along with the pedestal 91. Additionally, the pedestal 91 can be set as the base unit 100.

As illustrated in step S1, the control device 20 moves the base unit 100 so that the pedestal 91 of the base unit 100 is disposed below the deposition head 12 in the Z-axis direction by the table unit 11.

Next, as illustrated in step S2, the control device 20 introduces the powder from the powder introduction unit 35 into the deposition head 12 and emits the laser beam L while injecting the powder P from the deposition head 12 along with the gas. The powder P has a predetermined convergence diameter and is injected toward the pedestal 91 of the base unit 100. The laser beam L is emitted to the powder P with a predetermined spot diameter between the deposition head 12 and the pedestal 91. Here, the position of the spot diameter of the laser beam L in the Z-axis direction with respect to the position of the convergence diameter of the powder P in the Z-axis direction and the spot diameter at the position of the convergence diameter of the powder P in the Z-axis direction can be controlled by, for example, the movement of the position of the light concentrating unit 49.

As illustrated in step S3, the control device 20 injects the powder P from the deposition head 12 while emitting the laser beam L so that the powder P is melted by the irradiation with the laser beam L. The melted powder P which is a molten body A falls downward in the Z-axis direction toward the pedestal 91 of the base unit 100.

The molten body A which falls downward in the Z-axis direction reaches a predetermined position of the pedestal 91 of the base unit 100. The molten body A on the pedestal 91 is cooled at a predetermined position on the pedestal 91 by, for example, heat radiation. As illustrated in step S4, the cooled molten body A is solidified as a solid body B on the pedestal 91.

The control device 20 forms the solid body B on the base unit 100 by the deposition head 12 according to a sequence from step S2 to step S4 while moving the base unit 100 to a predetermined position by the table unit 11. When these sequences are repeated, as illustrated in step S5, the solid body B forms a formed layer 92 having a predetermined shape on the pedestal 91.

As illustrated in step S6, the control device 20 moves the pedestal 91 of the base unit 100 by the table unit 11 so that the formed layer 92 formed on the pedestal 91 is disposed below the machining unit 13 in the Z-axis direction. Further, the control device 20 performs a machining operation on the formed layer 92 by the machining unit 13. The control device 20 determines whether to perform a machining operation by the machining unit 13. If this machining operation is not necessary, the machining operation may not be performed. Thus, there is a case where the machining operation illustrated in step S6 is not performed in accordance with the instruction of the control device 20.

Next, as illustrated in step S7, the control device 20 moves the base unit 100 by the table unit 11 so that the formed layer 92 formed on the pedestal 91 is disposed below the deposition head 12 in the Z-axis direction. Then, the sequence from step S2 to step S6 is repeated so that a formed layer 93 is sequentially deposited on the formed layer 92 and thus the three-dimensional object is manufactured.

From the description above, the three-dimensional deposition device 1 according to the embodiment manufactures the three-dimensional object as below. The powder injection unit of the deposition head 12 injects the powder P toward the pedestal 91 of the base unit 100. Further, the inner tube 42 of the deposition head 12 irradiates the powder P provided between the deposition head 12 and the pedestal 91 with the laser beam L. The powder P which is irradiated with the laser beam L is melted and solidified on the pedestal 91 of the base unit 100 and thus the formed layer 92 is formed. The three-dimensional deposition device 1 sequentially deposits the formed layer 93 on the formed layer 92 and performs an appropriate machining operation on the formed layers 92 and 93 by the machining unit 13 to manufacture the three-dimensional object.

In the embodiment, the three-dimensional object is manufactured on the pedestal 91, but the three-dimensional object may not be manufactured on the pedestal 91. The three-dimensional object may be directly manufactured on, for example, the base unit 100. Further, the three-dimensional deposition device 1 may perform so-called overlay welding by depositing a formed layer on an existing shaped material.

Figure 17A:
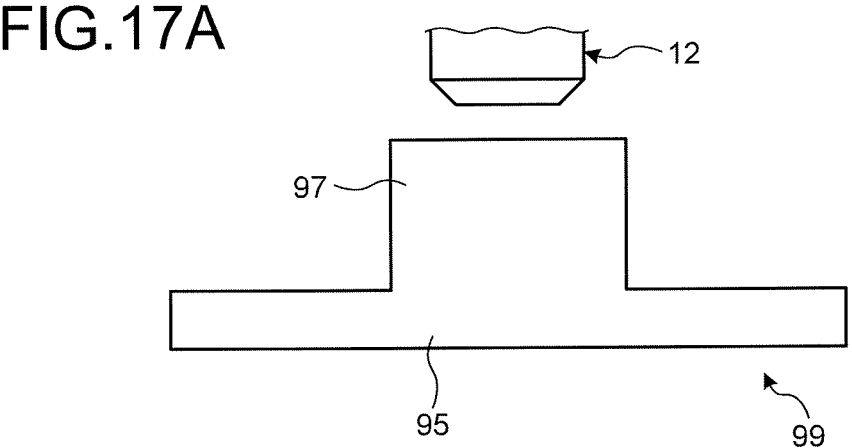
FIG. 17A is an explanatory diagram illustrating the three-dimensional object manufacturing method by the three-dimensional deposition device according to the embodiment.
Figure 17B:
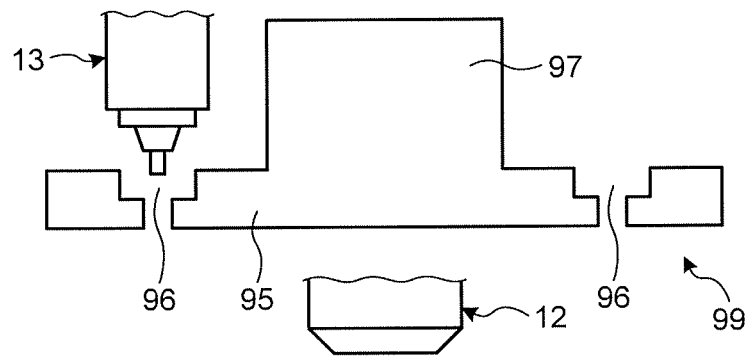
FIG. 17B is an explanatory diagram illustrating the three-dimensional object manufacturing method by the three-dimensional deposition device according to the embodiment.
Figure 17C:
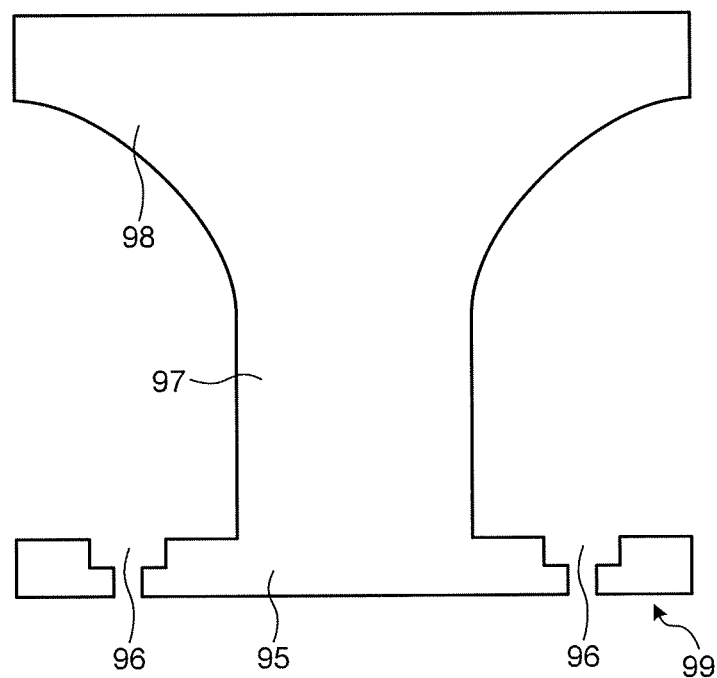
FIG. 17C is an explanatory diagram illustrating the three-dimensional object manufacturing method by the three-dimensional deposition device according to the embodiment.

In the embodiment, the machining unit 13 is used to perform, for example, a machining operation on the surface of the formed layer 92, but may perform a machining operation on the other part. FIGS. 17A to 17C are schematic diagrams illustrating a three-dimensional object manufacturing method by the three-dimensional deposition device 1 according to the embodiment. FIGS. 17A to 17C illustrate a sequence of manufacturing a member 99 illustrated in FIG. 17C by the three-dimensional deposition device 1.

The member 99 includes a disc part 95, a shaft part 97, and a truncated conical part 98. Further, the member 99 is formed so that a threaded hole 96 is formed in the disc part 95. As illustrated in FIG. 17C, the disc part 95 is a disc-shaped member. The shaft part 97 is a shaft-shaped member that has a diameter smaller than that of the disc part 95 and extends from a center of one face of the disc part 95. The threaded hole 96 is provided at the outside of the shaft part 97 of the disc part 95. The truncated conical part 98 is provided at a front end of the shaft part 97 and is formed so that an outer diameter increases as it goes toward an opposite side to the disc part 95. A long diameter of the truncated conical part 98 is equal to, for example, an outer diameter of the disc part 95. That is, the threaded hole 96 is located at the inside of the long diameter of the truncated conical part 98.

Next, a sequence of manufacturing the member 99 by the three-dimensional deposition device 1 will be described. As illustrated in FIG. 17A, the three-dimensional deposition device 1 forms the disc part 95 and the shaft part 97 by depositing the formed layer through the deposition head 12. After the disc part 95 and the shaft part 97 are manufactured, the three-dimensional deposition device 1 forms the threaded hole 96 by the machining unit 13 as illustrated in FIG. 17B. After the threaded hole 96 is formed, the three-dimensional deposition device 1 forms the truncated conical part 98 on the shaft part 97 by depositing the formed layer through the deposition head 12. The member 99 is manufactured in this way.

Here, a long diameter part of the truncated conical part 98 is located at the outside of the threaded hole 96. In other words, an area above the threaded hole 96 is covered by the truncated conical part 98. Thus, for example, when the member 99 is manufactured by a machining operation, a processing tool for the threaded hole 96 cannot be moved from an area above the truncated conical part 98 toward the disc part 95. However, the three-dimensional deposition device 1 forms the threaded hole 96 before the truncated conical part 98 is manufactured. In this case, the area above the threaded hole 96 is not covered. Thus, the three-dimensional deposition device 1 can process the threaded hole 96 by moving the machining unit 13 along the Z-axis direction from above in the Z-axis direction. In this way, the machining unit 13 can easily perform a machining operation by adjusting timing for the formed layer forming operation and the machining operation.

Figure 18:
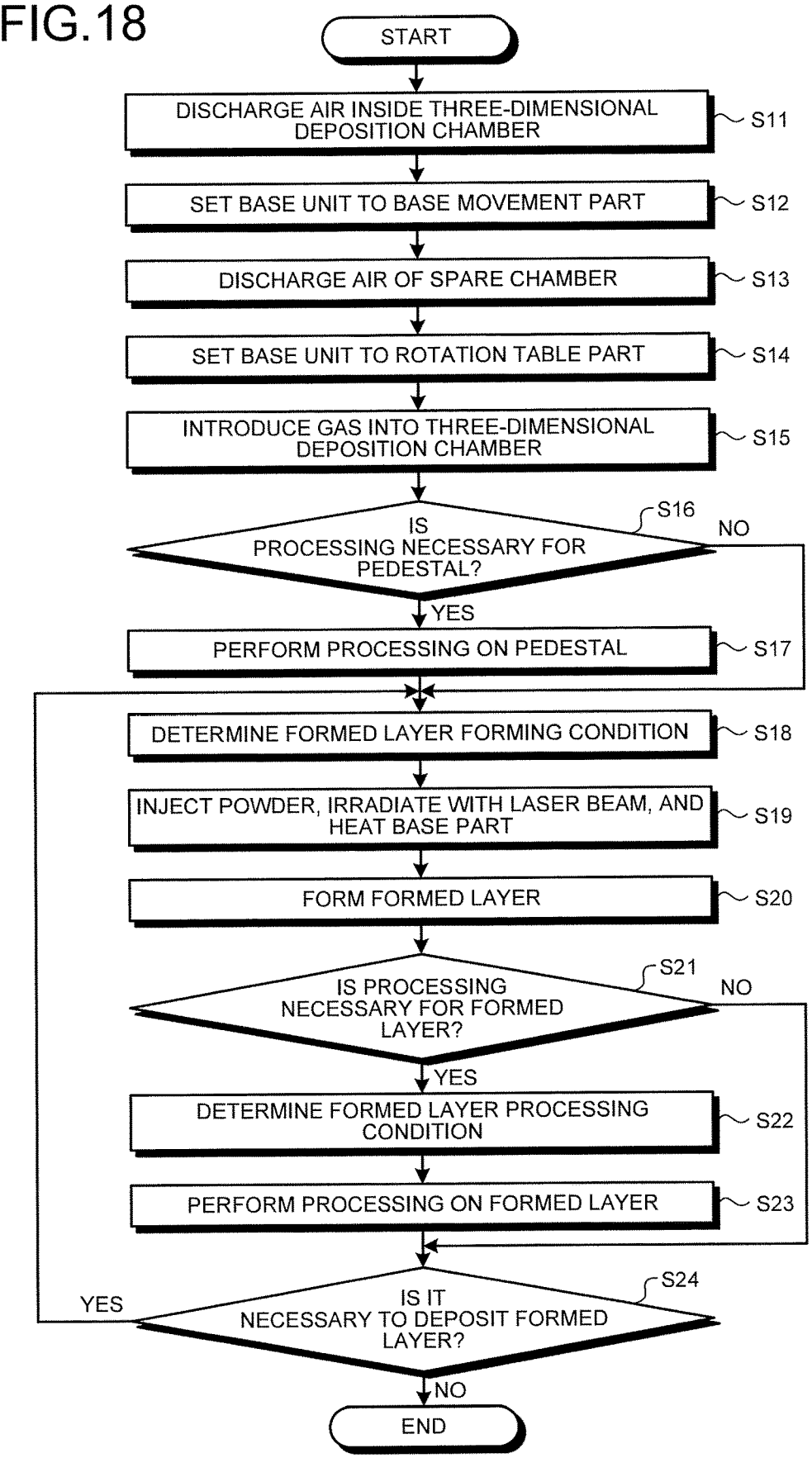
FIG. 18 is a flowchart illustrating a three-dimensional object manufacturing step by the three-dimensional deposition device according to the embodiment.

Next, a detailed process of manufacturing the three-dimensional object by the three-dimensional deposition device 1 according to the embodiment will be described. FIG. 18 is a flowchart illustrating a step of manufacturing the three-dimensional object by the three-dimensional deposition device 1 according to the embodiment. The control device 20 reads, for example, the three-dimensional object design information stored in the storage unit 53.

Next, the control device 20 discharges air in the three-dimensional deposition chamber 2 by the air discharge unit 37 (step S11). Here, the three-dimensional deposition chamber 2 is separated from the spare chamber 3 while the door 6 is closed. Further, in the three-dimensional deposition chamber 2, a part which communicates with the other external air is also closed and sealed. For example, the control device 20 discharges air from the air discharge unit 37 so that an oxygen concentration in the three-dimensional deposition chamber 2 is 100 ppm or less and desirably 10 ppm or less. The control device 20 can set an inert state by changing the oxygen concentration inside the three-dimensional deposition chamber 2 to 100 ppm or less and further reliably set an inert state by changing the oxygen concentration to 10 ppm or less.

Next, the base unit 100 with the pedestal 91 is attached to the base movement unit 36 inside the spare chamber 3 (step S12). Additionally, the three-dimensional deposition device 1 may perform a process in step S12 prior to a process in step S11.

After the base movement unit 36 in the spare chamber 3 is attached, the control device 20 closes the door 7 of the spare chamber 3 and discharges air inside the spare chamber 3 by the air discharge unit 25 (step S13). The control device 20 discharges air by the air discharge unit 25 so that the oxygen concentration in the spare chamber 3 decreases. It is desirable that the oxygen concentration inside the spare chamber 3 be equal to, for example, the oxygen concentration inside the three-dimensional deposition chamber 2.

When the air of the spare chamber 3 is completely discharged, the control device 20 opens the door 6 of the three-dimensional deposition chamber 2 and attaches the base unit 100 to the rotation table unit 17 inside the three-dimensional deposition chamber 2 by the base movement unit 36 (step S14). The base unit 100 is fixed to the rotation table unit 17. After the base unit 100 is attached to the rotation table unit 17, the control device 20 returns the base movement unit 36 into the spare chamber 3 and closes the door 6.

After the base unit 100 is set to the rotation table unit 17, the control device 20 introduces a gas into the three-dimensional deposition chamber 2 by the gas introduction unit 38 (step S15). The control device 20 forms an atmosphere of an introduction gas inside the three-dimensional deposition chamber 2 by the gas introduction unit 38. In the embodiment, the gas which is introduced by the gas introduction unit 38 is an inert gas such as nitrogen or argon. The gas introduction unit 38 introduces the inert gas so that the residual oxygen concentration in the three-dimensional deposition chamber 2 becomes 100 ppm or less.

Further, the three-dimensional deposition device 1 may omit step S11, step S13, and step S15 in accordance with the type of powder material. For example, when any problem does not occur in the quality of the three-dimensional object even by the oxidization of the powder material, these steps may be omitted so that the three-dimensional deposition chamber 2 and the spare chamber 3 have atmospheric air.

When the inert gas is completely introduced into the three-dimensional deposition chamber 2, the control device 20 determines whether to perform a machining operation on the pedestal 91 of the base unit 100 (step S16). For example, the control device 20 measures a surface shape of the pedestal 91 by the shape measurement unit 30. The control device 20 determines whether to perform a machining operation on the pedestal 91 based on a measurement result of the shape measurement unit 30. For example, when surface roughness of the pedestal 91 is larger than a predetermined value, the control device 20 determines that the machining operation is performed on the pedestal 91. Here, the determination on whether the machining operation needs to be performed on the pedestal 91 by the control device 20 is not limited thereto and may not be performed by the measurement result of the shape measurement unit 30. The control device 20 may store, for example, information of the pedestal 91 in the storage unit 53. The control device 20 may determine whether the pedestal 91 needs to be processed based on the information of the pedestal 91 and the three-dimensional object design information. The control device 20 may be set to process the pedestal 91 at all times.

When the control device 20 determines that the machining operation for the pedestal 91 is needed (Yes in step S16), the control device 20 performs the machining operation for the pedestal 91 at a predetermined condition by the machining unit 13 (step S17). The control device 20 determines a condition of the machining operation for the pedestal 91 based on, for example, the shape measurement result of the pedestal 91 obtained by the shape measurement unit 30 or the information of the pedestal 91 and the three-dimensional object design information.

When the control device 20 determines that the processing for the pedestal 91 is not needed (No in step S16) or the machining operation for the pedestal 91 is performed at a predetermined condition, the control device 20 determines the formed layer forming condition based on, for example, the three-dimensional object design information read from the storage unit 53 (step S18). For example, the formed layer forming condition is a condition necessary to form the formed layer and includes a shape of each formed layer, a type of powder P, an injection speed of the powder P, an injection pressure of the powder P, an irradiation condition of the laser beam L, a positional relation among a convergence diameter of the powder P, a spot diameter of the laser beam L, and a formed layer surface, a dimension and a temperature of the melted powder P in air, a dimension of a molten pool formed on a formed layer surface, a cooling speed, or a movement speed of the base unit 100 using the table unit 11.

When the control device 20 determines the formed layer forming condition, the deposition head 12 injects the powder P toward the pedestal 91 on the base unit 100 and irradiates the base unit 100 with the laser beam L and the base unit 100 starts to be heated (step S19). Since the control device 20 emits the laser beam L while injecting the powder P, the powder P can be melted by the laser beam L and the melted powder P can be solidified. Thus, the solid body B is formed on the pedestal 91. Further, the control device 20 irradiates the base unit 100 with the laser beam L from the heating head 31 so that the base unit 100 starts to be heated.

The control device 20 forms the formed layer 92 on the pedestal 91 by moving the base unit 100 using the table unit 11 while injecting the powder P and emitting the laser beam L (step S20). The control device 20 heats the formed layer 92 or a part to which the solid body B is not yet adhered by the heating head 31.

After the formed layer 92 is formed, the control device 20 determines whether a machining operation for the formed layer 92 is needed (step S21). For example, the control device 20 causes the shape measurement unit 30 to measure the surface shape of the formed layer 92. The control device 20 determines whether the machining operation for the formed layer 92 is needed based on the measurement result of the shape measurement unit 30. For example, when the surface roughness of the formed layer 92 is larger than a predetermined value, the control device 20 determines that the machining operation for the formed layer 92 is performed. However, the determination reference of the necessity of the machining operation for the formed layer 92 is not limited thereto. For example, the control device 20 may determine whether the machining operation for the formed layer 92 is needed based on the three-dimensional object design information and the formed layer forming condition. For example, when the surface roughness of the formed layer 92 calculated from the formed layer forming condition is larger than the necessary surface roughness based on the three-dimensional object design information, the control device 20 may determine that the machining operation for the formed layer 92 is needed.

When the control device 20 determines that the machining operation for the formed layer 92 is not needed (No in step S21), a process proceeds to step S24. When the control device 20 determines that the machining operation for the formed layer 92 is needed (Yes in step S21), the control device 20 determines a processing condition of the machining operation for the formed layer 92 (step S22). For example, the control device 20 determines the processing condition based on the measurement result of the shape measurement unit 30, or based on the three-dimensional object design information and the condition of forming the formed layer 92, or the like. After the control device 20 determines the formed layer processing condition, the control device 20 performs the machining operation for the formed layer 92 by the machining unit 13 based on the determined processing condition (step S23).

When the control device 20 performs the machining operation for the formed layer 92 or determines that the machining operation for the formed layer 92 is not needed, the control device determines whether to further deposit the formed layer 93 on the formed layer 92 (step S24). The control device 20 determines whether to further deposit the formed layer 93 on the formed layer 92 based on, for example, the three-dimensional object design information read from the storage unit 53.

When the control device 20 determines that the deposition of the formed layer 93 is needed (Yes in step S24), the process returns to step S18 and the formed layer 93 is deposited on the formed layer 92. When the control device 20 determines that the deposition of the formed layer 93 is not needed (No in step S24), the manufacture of the three-dimensional object is completed.

The three-dimensional deposition device 1 manufactures the three-dimensional object in this way. The three-dimensional deposition device 1 according to the embodiment manufactures the three-dimensional object by injecting the powder P through the deposition head 12 and irradiating the powder P with the laser beam L. Specifically, the three-dimensional deposition device 1 irradiates the laser beam L toward the powder P moving toward a target, melts the powder before the powder reaches the target, and adheres the molten body A to the target. Accordingly, it is possible to form the formed layer while decreasing the melting amount by the laser beam L or without melting the target. Accordingly, it is possible to reduce an influence of the laser beam with respect to the manufactured target or the formed layer and further deposit the solid body B on the manufactured target. From the description above, the three-dimensional deposition device 1 can manufacture the three-dimensional object with high accuracy.

Further, since the three-dimensional deposition device 1 heats the base unit or the formed layer by the heating head 31 while selecting a heating position, it is possible to further appropriately control the formed layer forming condition. For example, when an area having passed through a position irradiated with the laser beam in the formed layer, that is, an area where the formed layer is already formed heated by the heating head 31, the strength of the formed layer can be adjusted. Accordingly, it is possible to control a state of the formed layer with high accuracy while adjusting the strength of the formed layer. Alternatively, when an area not having passed through a position irradiated with the laser beam, that is, the formed layer or the base unit where the molten body A is not adhered yet is heated by the heating head 31, it is possible to suppress a problem in which an abrupt decrease in temperature when the molten body is adhered to the base unit and thus further reliably obtain the molten body from the powder. Accordingly, since the three-dimensional deposition device 1 can perform a highly accurate processing operation, it is possible to manufacture the three-dimensional object with high accuracy.

Further, the three-dimensional deposition device 1 can perform an appropriate machining operation on the formed layer 92 by the machining unit 13. Thus, the three-dimensional deposition device 1 can manufacture the three-dimensional object with high accuracy. Further, in the above-described embodiment, the machining operation can be performed on the formed layer 92 or the base unit 100 by the machining unit 13 with high accuracy. However, the machining unit 13 may not be provided and the machining operation may not be performed.

Further, the base movement unit 36 moves the base unit 100 into the three-dimensional deposition chamber 2. There is a case where air is discharged in the three-dimensional deposition chamber 2. For example, even when the operator does not enter the three-dimensional deposition chamber 2, the base movement unit 36 can move the base unit 100 in the three-dimensional deposition chamber 2.

Figure 19:
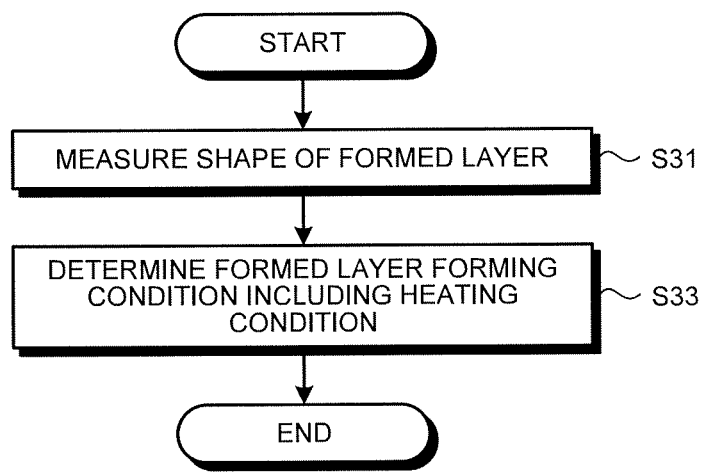
FIG. 19 is a flowchart illustrating an example of a step of determining a formed layer forming condition by the three-dimensional deposition device according to the embodiment.

Here, it is desirable that the three-dimensional deposition device 1 determine the formed layer forming condition by the shape measurement unit 30. FIG. 19 is a flowchart illustrating an example of a step of determining the formed layer forming condition by the three-dimensional deposition device 1 according to the embodiment. The process of FIG. 19 can be performed as a part of the process in step S18 of FIG. 18. The control device 20 measures a shape of the formed layer 92 by the shape measurement unit 30 (step S31). The control device 20 may measure the shape of the formed layer 92 by the shape measurement unit 30 while forming the formed layer by the deposition head 12. The shape measurement unit 30 can measure both a shape of a position where the solid body B is to be formed by the deposition head 12 and a shape of the solid body B formed at that position. That is, the shape measurement unit 30 can measure a surface shape before and after the formed layer 92 is formed. After the control device 20 measures the shape of the formed layer 92, the control device 20 determines a condition of forming the formed layer 92 including a heating condition based on a measurement result of the shape measurement unit 30 (step S33).

Since the control device 20 determines the heating condition in response to a surface shape measurement result of the formed layer 92 obtained by the shape measurement unit 30, it is possible to determine the heating amount in each position in response to the shape of the formed layer 92 and further appropriately heat each position. Accordingly, since it is possible to obtain a uniform temperature or a uniform change in temperature at each position, it is possible to perform a processing operation with higher accuracy.

Further, the control device 20 determines the formed layer forming condition in response to the surface shape measurement result of the formed layer 92 obtained by the shape measurement unit 30 and controls an operation of the deposition head 12. Thus, the three-dimensional deposition device 1 can further appropriately form the formed layer by setting a uniform distance between the formed layer forming position and the deposition head 12 or the like. Further, the three-dimensional deposition device 1 can measure the shape of the formed layer 92 by the shape measurement unit 30 while forming the formed layer by the deposition head 12. Thus, the three-dimensional deposition device 1 can determines the formed layer forming condition more appropriately and further highly accurately manufacture the three-dimensional object based on the further appropriate formed layer forming condition. Here, in the above-described embodiment, the processing operation using the deposition head 12 has been described, but a processing operation using the machining unit 13 can be performed in the same way. Further, the formed layer forming condition determined in the above-described embodiment may be changed in accordance with a position or may be constant.

It is desirable that the three-dimensional deposition device 1 determine, as the formed layer forming condition, the movement path of the deposition head 12, that is, a relative relation between the movement of the table unit 11 and the Z-axis position of the deposition head 12 based on a detection result. Accordingly, it is possible to uniformly set the thickness of the deposited formed layer, the temperature of the solid part, and a deposition speed.

Figure 20:
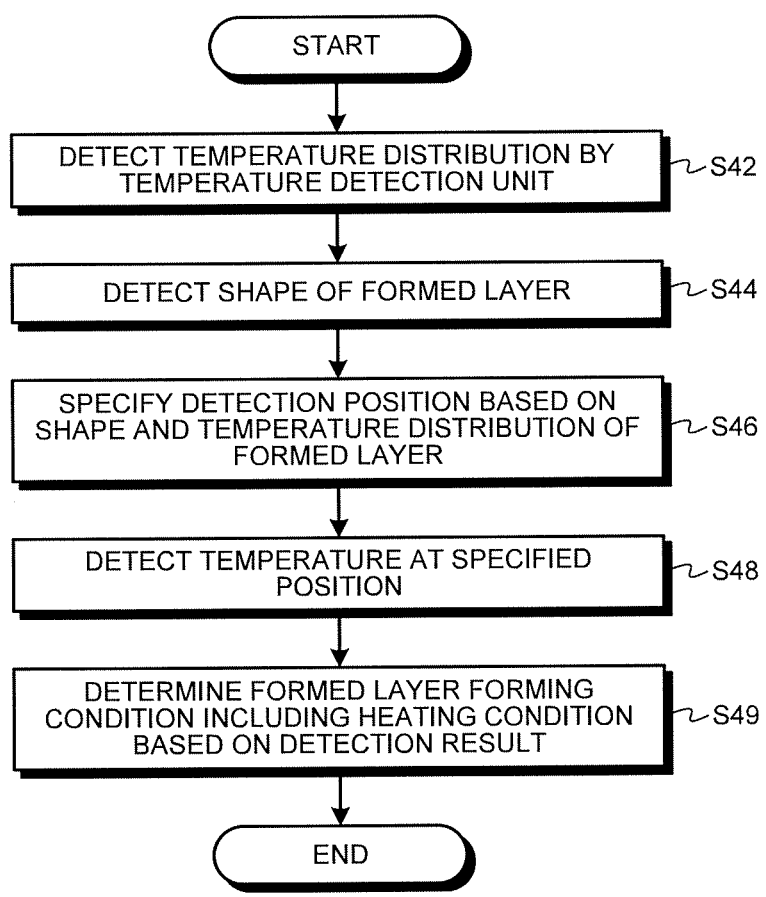
FIG. 20 is a flowchart illustrating an example of a step of determining the formed layer forming condition.

The three-dimensional deposition device 1 may determine a process operation based on a temperature distribution detected by the temperature detection unit 120. FIG. 20 is a flowchart illustrating an example of a step of determining the formed layer forming condition. The control device 20 detects a temperature distribution in the surface of the formed layer by the temperature detection unit 120 (step S42). The control device 20 can detect a temperature distribution in an entire area of the surface of the formed layer by the measurement of the temperature detection unit 120 while the base unit 100 is moved by the table unit 11. The control device 20 may perform the measurement before the processing operation is performed by the deposition head 12 or may perform the measurement while the processing operation is performed by the deposition head 12.

After the control device 20 detects a temperature distribution, the control device 20 detects a formed layer shape (a surface shape) by the shape measurement unit 30 (step S44). The surface shape and the temperature distribution in the formed layer may be detected at the same time.

After the control device 20 detects a shape of the formed layer, the control device 20 specifies a detection position for detecting a temperature by the temperature detection unit based on the shape and the temperature distribution of the formed layer (step S46) and then detects a temperature at the specified position (step S48). The control device 20 determines a formed layer forming condition including a heating condition based on the detected temperature (step S49) and ends the step.

The three-dimensional deposition device 1 can control a temperature or a change in temperature at each position by measuring a temperature at a specific position, for example, a position which is not easily cooled or easily warmed and determining a heating condition. The three-dimensional deposition device 1 thus can perform a further appropriate processing operation.

Further, the three-dimensional deposition device 1 can uniformly set the thickness of the deposited formed layer, the temperature of the solid part, and a deposition speed by determining a movement path of the deposition head 12 as a processing condition based on a temperature distribution and a shape, that is, by determining a processing condition including a temperature distribution. That is, a further uniform processing operation can be performed with the processing condition determined based on the position which is not easily cooled and easily warmed.

Further, in the example illustrated in FIG. 20, a temperature is detected again, but the formed layer forming condition including the heating condition may be determined without the processes in step S46 and step S48. Since the three-dimensional deposition device 1 determines the heating condition based on the temperature distribution and the shape, it is possible to control a temperature or a change in temperature at each position with high accuracy.

Further, the three-dimensional deposition device 1 may determine a process operation by using a detection result of the weight detection unit 130. For example, the three-dimensional deposition object may be evaluated by a change in weight caused by the formed object. Specifically, the density of the three-dimensional deposition object can be calculated by a change in size and weight and thus a void formed in the three-dimensional deposition object can be detected. Further, the three-dimensional deposition device 1 can detect a foreign matter attached to the base unit 100, that is, an unmelted powder material or chips produced during a processing operation of the machining unit 13 based on the weight of the weight detection unit 130. Accordingly, this measurement result can be used to control the operation of the powder collection unit 39.

Figure 21:
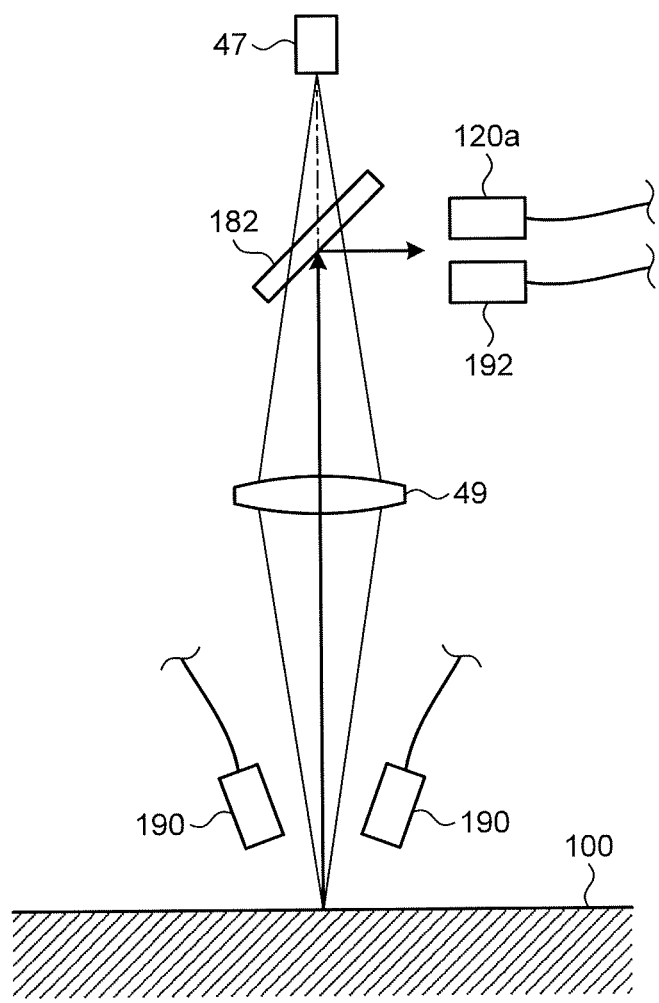
FIG. 21 is a schematic diagram illustrating another example in the periphery of the deposition head of the three-dimensional deposition device.

The three-dimensional deposition device may further include another detection unit that detects a parameter for controlling a forming condition. FIG. 21 is a schematic diagram illustrating another example of the periphery of the deposition head of the three-dimensional deposition device. The three-dimensional deposition device illustrated in FIG. 21 includes a temperature detection unit 120a, a half mirror 182, a plasma emission detection unit 190, and a reflected light detection unit 192 in the periphery of the laser beam path of the deposition head. The half mirror 182 is disposed between the light source 47 and the light concentrating unit 49. The half mirror 182 causes the laser beam directed from the light source 47 toward the light concentrating unit 49 to be transmitted therethrough and reflects the laser beam directed from the light concentrating unit 49 toward the light source 47. That is, the half mirror 182 reflects the laser beam reflected by the base unit 100 or the formed layer in a predetermined direction.

The plasma emission detection unit 190 detects plasma which is generated by the irradiation of the laser beam L to the base unit 100, the formed layer, or the supplied powder. The reflected light detection unit 192 detects the laser beam L reflected by the half mirror 182. Further, the temperature detection unit 120a detects a temperature based on a condition at the position of the laser beam reflected by the half mirror 182.

Figure 22:
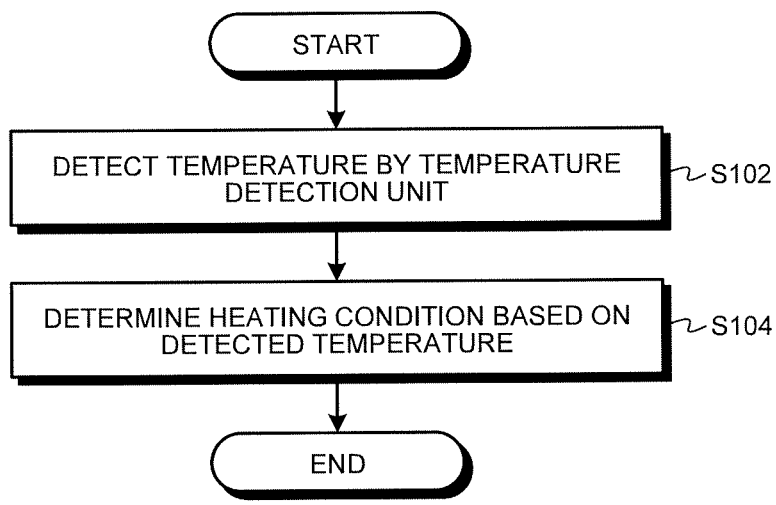
FIG. 22 is a flowchart illustrating an example of a step of determining the formed layer forming condition.
Figure 23:
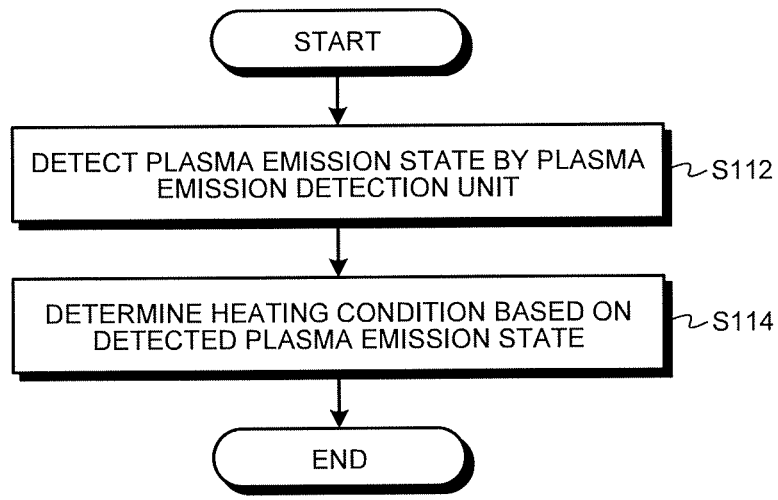
FIG. 23 is a flowchart illustrating an example of a step of determining the formed layer forming condition.
Figure 24:
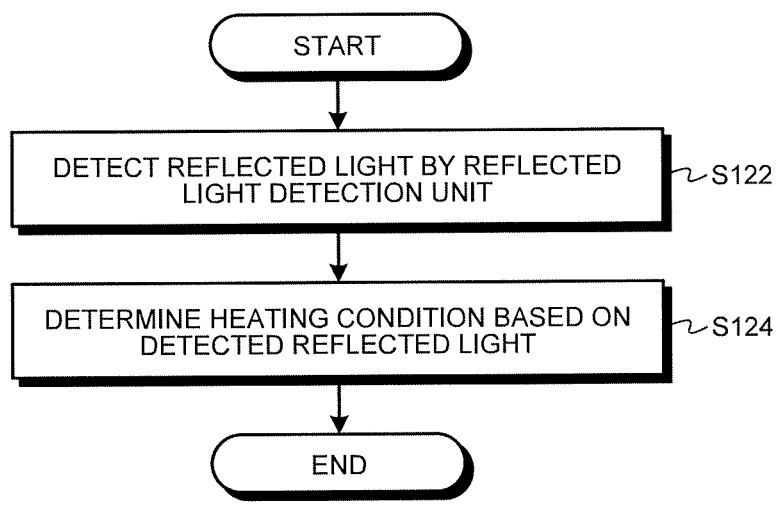
FIG. 24 is a flowchart illustrating an example of a step of determining the formed layer forming condition.

Next, an example of a control which is performed by components will be described with reference to FIGS. 22 to 24. FIG. 22 is a flowchart illustrating an example of a step of determining a formed layer forming condition, that is, a heating condition of the heating head. The processes from FIGS. 22 to 24 are desirably performed along with the processing operation of the deposition head, but may be performed when the forming condition is determined. The control device 20 detects a temperature by the temperature detection unit 120a (step S102), determines a heating condition based on the detected temperature (result) (step S104), and ends the process. When the control device 20 determines the heating condition of the heating head 31 based on the detection result obtained by the temperature detection unit 120a, it is possible to further uniformly set the temperature of the formed layer and to perform a highly accurate processing operation. Further, the same process can be performed even in the case of the temperature detection unit 120.

FIG. 23 is a flowchart illustrating an example of a step of determining the formed layer forming condition. The control device 20 detects a plasma emission state by the plasma emission detection unit 190 (step S112), determines a heating condition based on the detected plasma emission state (step S114), and ends the process. Even when the control device 20 determines the heating condition of the heating head 31 based on the detection result obtained by the plasma emission detection unit 190, it is possible to further uniformly set the temperature of the formed layer and to perform a highly accurate processing operation. Here, the control device 20 can monitor the temperature of the focal position of the laser by detecting a plasma emission state by the plasma emission detection unit 190. Since plasma generated when the injected powder is melted by a laser beam emitted thereto is detected, a powder melted state in the gas can be monitored.

FIG. 24 is a flowchart illustrating an example of a step of determining the formed layer forming condition. The control device 20 detects reflected light by the reflected light detection unit 192 (step S122), determines a heating condition based on the detected reflected light (step S124), and ends the process. Even when the control device 20 determines the heating condition of the heating head 31 based on the detection result obtained by the reflected light detection unit 192, it is possible to further uniformly set the temperature of the formed layer and to perform a highly accurate processing operation. Here, the control device 20 can monitor a temperature at a position to which the molten body A is adhered by detecting reflected light by the reflected light detection unit 192.

Here, it is desirable that the three-dimensional deposition device 1 have a configuration in which the temperature detection unit 120 and the heating head 31 rotate about the Z axis with respect to the deposition head 12. Accordingly, it is possible to uniformly set or change a relative position of the temperature detection unit 120 and the heating head 31 with respect to the deposition head 12 in response to the movement direction of the table unit 11. Further, the three-dimensional deposition device 1 may have a configuration in which two pieces of the temperature detection units 120 and the heating heads 31 are provided with respect to the deposition head 12 and are disposed with the deposition head 12 interposed therebetween.

Figure 25:
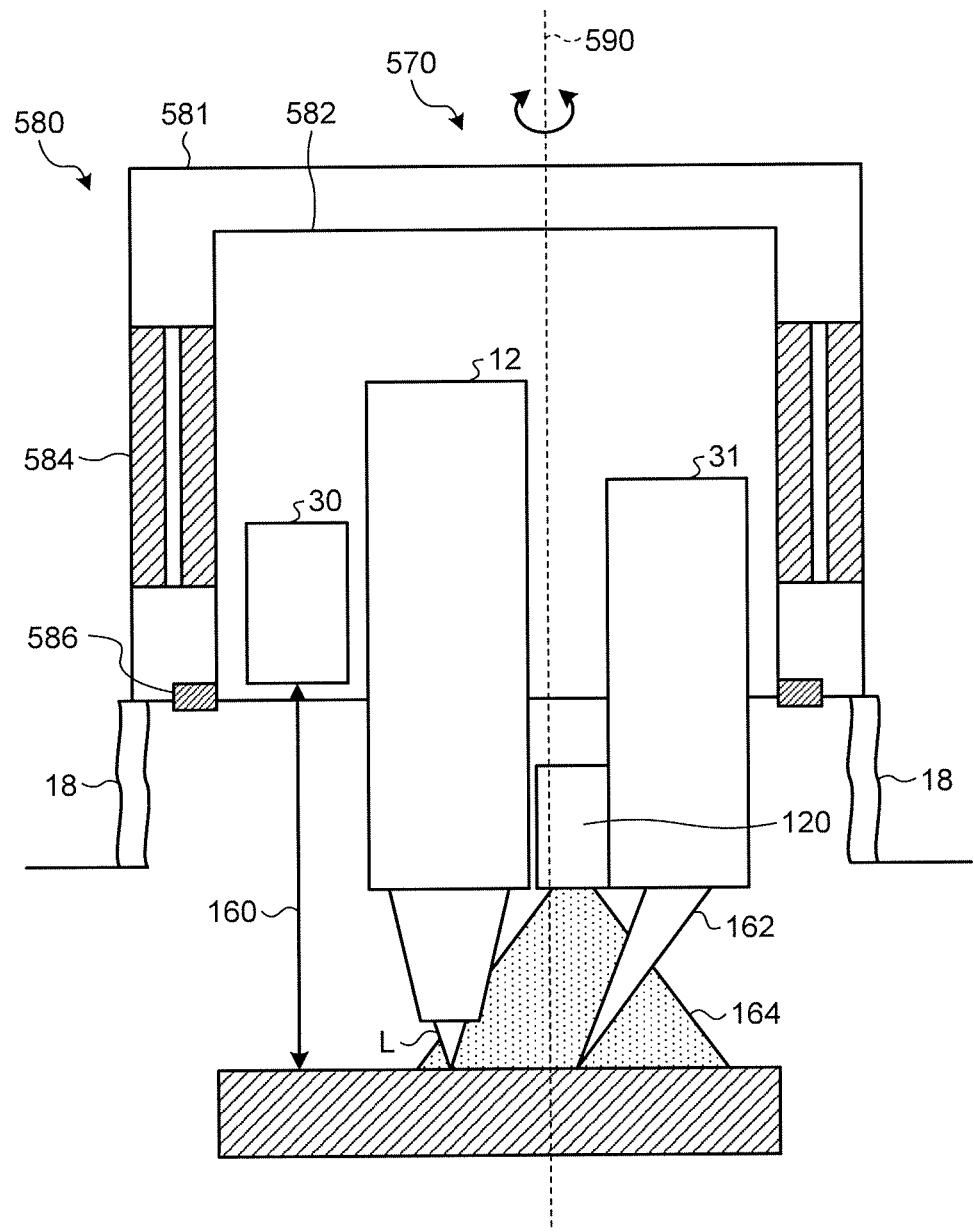
FIG. 25 is a schematic diagram illustrating another example of the deposition head accommodation chamber.

FIG. 25 is a schematic diagram illustrating another example of the deposition head accommodation chamber. A deposition head accommodation chamber 570 illustrated in FIG. 25 supports the deposition head 12, the shape measurement unit 30, and the heating head 31. In the deposition head accommodation chamber 570, a part that supports the deposition head 12, the shape measurement unit 30, and the heating head 31 becomes a switching mechanism 580. The switching mechanism 580 includes a fixed part 581, a movable part 582, a rotation mechanism 584, and a seal part 586. The fixed part 581 is supported by the Z-axis slide unit 4a and a bottom face thereof is connected to the bellows 18. The movable part 582 is embedded in the fixed part 581 and is used to fix the deposition head 12, the shape measurement unit 30, and the heating head 31. The rotation mechanism 584 rotates the movable part 582 about an axis 590 with respect to the fixed part 581. The seal part 586 rotatably seals a gap between the fixed part 581 and the movable part 582 in a lower face in the vertical direction, that is, in a face exposed to the three-dimensional deposition chamber 2.

When the switching mechanism 580 rotates the movable part 582 with respect to the fixed part 581, the relative positions of the deposition head 12 and the heating head 31 supported by the movable part 582 can be switched. Accordingly, the switching mechanism 580 can switch a state where the deposition head 12 is located at the upstream side of the heating head 31 and a state where the deposition head 12 is located at the downstream side of the heating head 31, in the relative movement directions of the deposition head 12 and the base unit 100, that is, a direction in which the table unit 11 moves the base unit 100. That is, when the base unit 100 moves in the same direction, an anteroposterior position of the deposition head 12 and the heating head 31 for the processing position can be switched when the movable part 582 is rotated by 180°. Accordingly, it is possible to switch a state where the heating head 31 heats the base unit 100 or the formed layer before passing by the deposition head 12 (a state before the formed layer is formed) or a state where the heating head heats the base unit 100 or the formed layer having passed by the deposition head 12 (a state after the formed layer is formed).

Figure 26:
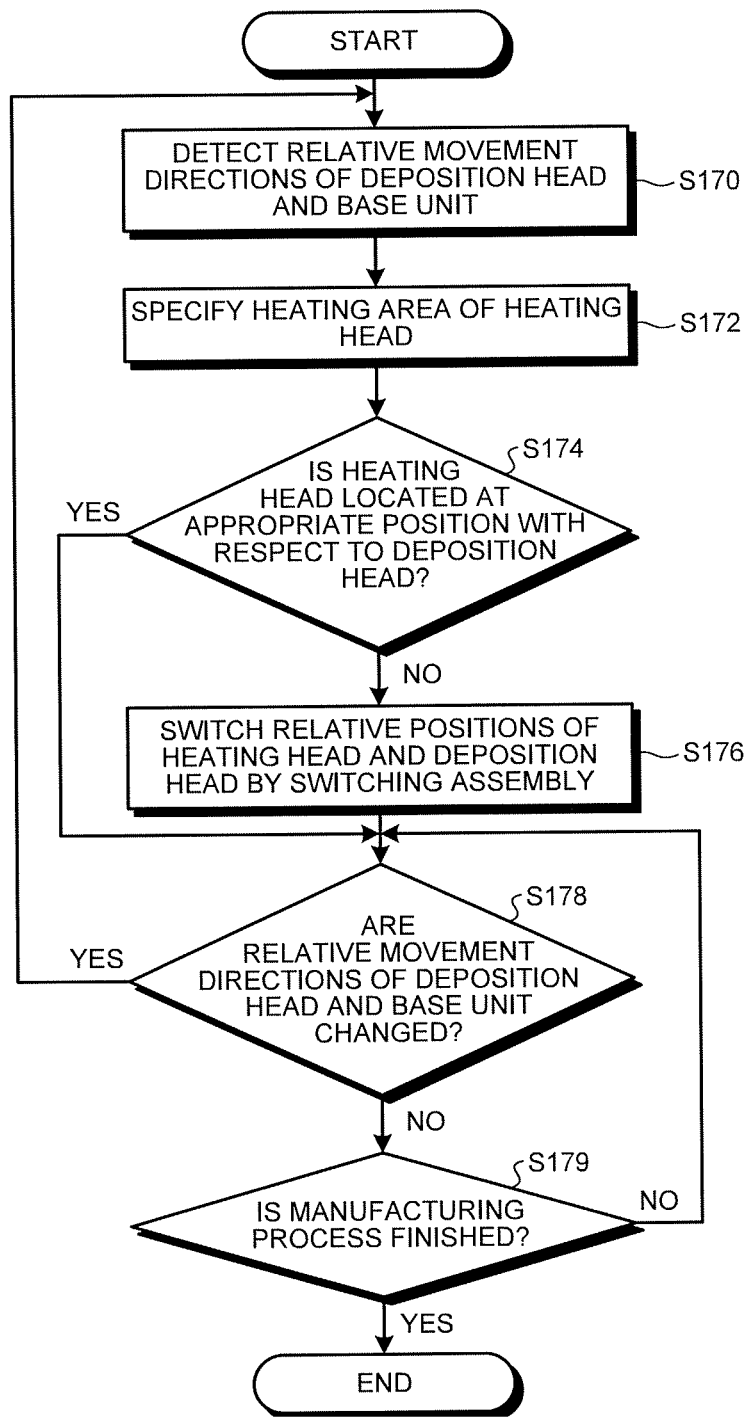
FIG. 26 is a flowchart illustrating an example of a process operation by the three-dimensional deposition device.

FIG. 26 is a flowchart illustrating an example of a process operation of the three-dimensional deposition device. The control device 20 detects the relative movement directions of the deposition head 12 and the base unit 100 (step S170) and specifies a heating area of the heating head 31 (step S172). The heating area of the heating head 31 is set in the base unit 100 which is processed by the deposition head 12 and includes an area heating the base unit 100 or the formed layer on which the deposition head 12 has not passed yet and an area heating the base unit 100 or the formed layer on which the deposition head 12 has already passed.

The control device 20 determines whether the heating head 31 is at an appropriate position with respect to the deposition head 12 (step S174). That is, it is determined whether the heating head is located at the heating area based on the relative movement directions of the deposition head 12 and the base unit 100, the heating area, and the current relative positions of the deposition head 12 and the heating head 31.

When the control device 20 determines that the heating head 31 is located at an appropriate position with respect to the deposition head 12 (Yes in step S174), a process proceeds to step S178. When the control device 20 determines that the heating head 31 is not located at an appropriate position with respect to the deposition head 12 (No in step S174), the control device 20 switches the relative positions of the heating head 31 and the deposition head 12 by the switching mechanism 580 (step S176) and the process proceeds to step S178.

When it is Yes in step S174 or the control device 20 performs a process in step S176, the control device 20 determines whether the relative movement directions of the deposition head 12 and the base unit 100 are changed (step S178). When the control device 20 determines that the movement direction is changed (Yes in step S178), the process returns to step S170. When the control device 20 determines that the movement direction is not changed (No in step S178), the control device 20 determines whether to finish the manufacturing process (step S179). When the control device 20 determines that the manufacturing process will not be finished (No in step S179), the process returns to step S178. Meanwhile, when the control device 20 determines that the manufacturing process will be finished (Yes in step S179), the process ends.

The three-dimensional deposition device 1 can set a relation of the deposition head and the heating head with respect to a processing position in response to a setting by performing the process illustrated in FIG. 26 so that the relative positions of the deposition head and the heating head are switched in response to the relative movement directions of the deposition head and the base unit. Accordingly, it is possible to suppress a change in heating position of the heating head with respect to a position processed by the deposition head in accordance with the relative movement between the deposition head and the base unit. Accordingly, it is possible to perform a highly accurate processing operation.

While the embodiments of the invention have been described, the embodiments are not limited to the content of these embodiments. Further, the above-described components include a component which is easily supposed by the person skilled in the art, a component which has substantially the same configuration, and a component which is in a so-called equivalent scope. The above-described components can be appropriately combined with one another. Additionally, various omissions, substitutions, or modifications of the components can be made without departing from the spirit of the above-described embodiments. For example, the three-dimensional deposition device 1 is not limited to a configuration in which the deposition head 12 injects the powder P and irradiates the powder P with the laser beam L. The three-dimensional deposition device 1 may form a formed layer by supplying the powder P and irradiating the powder P with the laser beam L and may perform an appropriate machining operation on the formed layer. For example, the three-dimensional deposition device 1 may form the formed layer by forming a powder layer by a powder supply unit and irradiating a part of the powder layer with the laser beam L to sinter the powder.

REFERENCE SIGNS LIST

1 THREE-DIMENSIONAL DEPOSITION DEVICE
2 THREE-DIMENSIONAL DEPOSITION CHAMBER
3 SPARE CHAMBER
4 DEPOSITION HEAD ACCOMMODATION CHAMBER
4a, 5a Z-AXIS SLIDE UNIT
5 MACHINING UNIT ACCOMMODATION CHAMBER
6, 7 DOOR
10 BED
11 TABLE UNIT

12 DEPOSITION HEAD
13 MACHINING UNIT
15 Y-AXIS SLIDE UNIT
16 X-AXIS SLIDE UNIT
17 ROTATION TABLE UNIT
18, 19 BELLOWS
20 CONTROL DEVICE
22 TOOL
23 NOZZLE
24 FRONT END
25 AIR DISCHARGE UNIT
30 SHAPE MEASUREMENT UNIT
31, 31a HEATING HEAD
32 MACHINING MEASUREMENT UNIT
33 TOOL EXCHANGE UNIT
34 NOZZLE EXCHANGE UNIT
35, 35A POWDER INTRODUCTION UNIT
36 BASE MOVEMENT UNIT
37 AIR DISCHARGE UNIT
38 GAS INTRODUCTION UNIT
39 POWDER COLLECTION UNIT
41 OUTER TUBE
42 INNER TUBE
43 POWDER PASSAGE
44 LASER PATH
46 MAIN BODY
47 LIGHT SOURCE
48 OPTICAL FIBER
49 LIGHT CONCENTRATING UNIT
51 INPUT UNIT
52 CONTROLLER
53 STORAGE UNIT
54 OUTPUT UNIT
55 COMMUNICATION UNIT
56 FRONT END
57 LIGHT SOURCE UNIT
58 IMAGE CAPTURING UNIT
81, 81A POWDER STORAGE UNIT
82, 82A POWDER IDENTIFICATION UNIT
83 CARTRIDGE
84 MATERIAL DISPLAY PART
85 INTRODUCTION PART
86 CYCLONE PART
87 GAS DISCHARGE PART
88 POWDER DISCHARGE PART
91 PEDESTAL
92, 93 FORMED LAYER
95 DISC PART
96 THREADED HOLE PART
97 SHAFT PART
98 TRUNCATED CONICAL PART
99 MEMBER
100 BASE UNIT
102, 104, 106, 108 ARROW
110, 112, 114 ROTATION AXIS
120, 120a TEMPERATURE DETECTION UNIT
130 WEIGHT DETECTION UNIT
140 FOCAL POSITION ADJUSTMENT UNIT
150 POWDER SUPPLY TUBE
152 DISTRIBUTION UNIT
154 BRANCH TUBE
156 MIXING UNIT
156a STIRRING PLATE
158 FLOW STRAIGHTENING DEVICE
162 LASER BEAM
164 MEASUREMENT WAVE
182 HALF MIRROR
190 PLASMA EMISSION DETECTION UNIT
192 REFLECTED LIGHT DETECTION UNIT
502, 502a LIGHT SOURCE UNIT
504, 504a HEATING POSITION ADJUSTMENT MECHANISM
512, 520, 560 MIRROR
512a, 514 GALVANO MIRROR
522, 562 ANGULAR POSITION ADJUSTMENT MECHANISM
532 AREA
540, 540a SEMICONDUCTOR LASER
542 LIGHT CONCENTRATING UNIT
544 OPTICAL FIBER
550 MULTIPLEXING UNIT
551 COLLIMATING LENS
552 DIFFRACTION GRATING
554 LIGHT CONCENTRATING UNIT
A MOLTEN BODY
B SOLID BODY
L LASER BEAM
P POWDER
P1, P2 FOCAL POSITION

The invention claimed is:

1. A three-dimensional deposition device for forming a three-dimensional shape, the three-dimensional deposition device, comprising:
a base unit;
a deposition head including a main body and a nozzle, the deposition head supplying a powder material from the nozzle in a direction of the base unit such that the powder material is injected from the nozzle towards a focal position of the powder material within a space between the base unit and the deposition head, the main body including an outer tube and an inner tube provided concentrically with respect to the outer tube, the outer tube and the inner tube defining a cylindrical powder passage that receives the powder material to be supplied to the nozzle;
a cylindrical flow straightener, straightening a flow of the powder material inside the cylindrical powder passage, provided inside the cylindrical passage;
a light irradiator which irradiates the powder material with a light beam in the space between the base unit and the deposition head, forms a molten body with droplet state by sintering or melting at least a part of the powder material irradiated with the light beam in the space, and forms the formed layer by solidifying the molten body dropped from the space to the base unit;
a heater which selectively heats an area having passed through a position irradiated with the light beam in the base unit or the formed layer or an area not having passed through the position irradiated with the light beam; and
a focal position adjustor provided in the deposition head and concentrates the light beam toward a focal point of the light beam, the focal position adjustor variably moves in a vertical direction within the deposition head to move the focal point of the light beam in a vertical direction with respect to the focal position of the powder material within the space between the base unit and the deposition head to sinter or melt the at least a part of the powder material at the focal point of the light beam.

2. The three-dimensional deposition device according to claim 1, wherein the light irradiator irradiates the powder material being fed from the deposition head toward the base unit with the light beam so that the powder material is melted and the melted powder material is solidified on the base unit to thereby form the formed layer.

3. The three-dimensional deposition device according to claim 2, wherein the deposition head is concentrically disposed on an outer periphery of the light irradiator the light beam of the light irradiator passes through the inner tube.

4. The three-dimensional deposition device according to claim 2, further comprising:
a deposition chamber that accommodates the light irradiator, and the deposition head, and the base unit, therein; and
a movement mechanism attached to the deposition chamber to relatively move the light irradiator and the deposition head with respect to the base unit; and
a controller that determines a path through which the light irradiator and the deposition head pass with respect to the base unit by the movement mechanism.

5. The three-dimensional deposition device according to claim 1,
wherein the heater includes a light source which outputs a second light beam, and
a heating operation by the heater is performed by irradiation with the second light beam output from the light source.

6. The three-dimensional deposition device according to claim 5,
wherein the second light beam is a laser beam.

7. The three-dimensional deposition device according to claim 5,
wherein the heater includes an irradiation position adjustment mechanism including a mirror which reflects the second light beam output from the light source and an angle adjustor connected to the mirror to adjust an angle of the mirror.

8. The three-dimensional deposition device according to claim 5,
wherein the light source includes a semiconductor laser which outputs the second laser beam, a light concentrator which concentrates the second laser beam output from the semiconductor laser, and an optical fiber to which the second laser beam concentrated by the light concentrating unit is incident.

9. The three-dimensional deposition device according to claim 8,
wherein the light source includes a plurality of the semiconductor lasers and a plurality of the light concentrators, and
the second laser beams which are output from the semiconductor lasers and are concentrated by the light concentrators are incident to one optical fiber.

10. The three-dimensional deposition device according to claim 8,
wherein the semiconductor laser is a vertical emission type semiconductor laser.

11. The three-dimensional deposition device according to claim 10,
wherein the plurality of semiconductor lasers is provided, and
the light concentrator includes a collimating lens which is disposed at each of the plurality of semiconductor lasers and a multiplexer which multiplexes second laser beams collimated by the plurality of collimating lenses and causes the second laser beam to be incident to the optical fiber.

12. The three-dimensional deposition device according to claim 1, further comprising:
a temperature detector which detects a temperature and a temperature distribution of a surface of the formed layer; and
a controller that controls a heating operation of the heater in response to a measurement result of the temperature of the surface of the formed layer obtained by the temperature detector.

13. The three-dimensional deposition device according to claim 12,
wherein the controller controls the heating operation of the heater based on the measurement result of the temperature of the surface of the formed layer obtained by the temperature detector and characteristics of the base unit and the formed layer.

14. The three-dimensional deposition device according to claim 1, further comprising:
a plasma emission detector which detects a plasma emission state of the surface of the formed layer; and
a controller that controls the heating operation of the heater in response to a measurement result obtained by the plasma emission detector.

15. The three-dimensional deposition device according to claim 1, further comprising:
a reflected light detector which detects reflected light from the surface of the formed layer; and
a controller that controls the heating operation of the heater in response to a measurement result obtained by the reflected light detector.

16. The three-dimensional deposition device according to claim 1,
wherein the heater heats the area having passed through the position irradiated with the light beam.

17. The three-dimensional deposition device according to claim 1,
wherein the heater heats the area not having passed through the position irradiated with the light beam.

18. The three-dimensional deposition device according to claim 1, further comprising:
a switcher which switches relative positions of the light irradiator and the heater; and
a controller that controls the relative positions of the light irradiator and the heater by the switcher in response to relative movement directions of the light irradiator, the heater, and the base unit and information whether an area to be heated by the heater is the area having passed through the position irradiated with the light beam in the base unit or the formed layer or the area not having passed through the position irradiated with the light beam.

19. The three-dimensional deposition device according to claim 1, wherein a diameter at an end of the outer tube and a diameter at an end of the inner tube are reduced to form a nozzle injection opening for injecting the powder material towards a focal point of the powder material.

20. The three-dimensional deposition device according to claim 1, further comprising:
a movement mechanism that relatively moves the light irradiator and the deposition head with respect to the base unit; and
a controller that controls the movement mechanism to move the irradiator and the deposition head along with the focal position of the light beam.

* * * * *